United States Patent
Wang et al.

(10) Patent No.: US 12,346,557 B2
(45) Date of Patent: Jul. 1, 2025

(54) APPLICATION WINDOW MANAGEMENT METHOD, TERMINAL DEVICE, AND COMPUTER-READABLE STORAGE MEDIUM

(71) Applicant: Huawei Technologies Co., Ltd., Shenzhen (CN)

(72) Inventors: Hongjun Wang, Shenzhen (CN); Yingfeng Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/921,568

(22) PCT Filed: Mar. 11, 2021

(86) PCT No.: PCT/CN2021/080231
§ 371 (c)(1),
(2) Date: Oct. 26, 2022

(87) PCT Pub. No.: WO2021/218429
PCT Pub. Date: Nov. 4, 2021

(65) Prior Publication Data
US 2023/0168802 A1 Jun. 1, 2023

(30) Foreign Application Priority Data
Apr. 27, 2020 (CN) .......................... 202010346737.4

(51) Int. Cl.
*G06F 3/04817* (2022.01)
*G06F 3/04886* (2022.01)

(52) U.S. Cl.
CPC .................. *G06F 3/04886* (2013.01); *G06F 2203/04803* (2013.01)

(58) Field of Classification Search
CPC .. G06F 3/0481; G06F 3/04817; G06F 3/0482; G06F 3/04886; G06F 2203/04803
See application file for complete search history.

(56) References Cited

U.S. PATENT DOCUMENTS

| 8,499,254 B2 | 7/2013 | Sareen et al. |
| 11,599,254 B2 | 3/2023 | Zhou et al. |
| (Continued) | | |

FOREIGN PATENT DOCUMENTS

| CN | 106775631 A | 5/2001 |
| CN | 104793846 A | 7/2015 |
| (Continued) | | |

OTHER PUBLICATIONS

Hoffman, C., "Windows Task Manager: The Complete Guide," How-To Geek, XP093082782, The Wayback Machine, Apr. 9, 2020, downloaded from https://www.howtogeek.com/405806/windows-task-manager-the-complete-guide/ on Jan. 10, 2024, 26 pages.

*Primary Examiner* — Dennis P Joseph
(74) *Attorney, Agent, or Firm* — SLATER MATSIL, LLP

(57) ABSTRACT

A method is disclosed including displaying, on a multi-task management interface, M application windows opened in a full-screen mode, where M is an integer greater than 2, displaying, at a second preset location of an application window corresponding to a first application, a multi-window identifier corresponding to the first application, where the first application is an application that corresponds to at least two of the M application windows, and, if it is detected that any one of the multi-window identifiers is triggered, displaying, on the multi-task management interface, all application windows corresponding to only the first application corresponding to the triggered multi-window identifier.

13 Claims, 22 Drawing Sheets

(56) References Cited

U.S. PATENT DOCUMENTS

| | | | |
|---|---|---|---|
| 2013/0246970 A1* | 9/2013 | Helle | G06F 3/0482 |
| | | | 715/822 |
| 2015/0067588 A1 | 3/2015 | Shim et al. | |
| 2015/0193100 A1* | 7/2015 | Strode | G06F 3/0481 |
| | | | 715/765 |
| 2022/0004292 A1* | 1/2022 | Shim | G06F 3/0482 |
| 2022/0137758 A1* | 5/2022 | Ording | G06F 3/0482 |
| | | | 715/778 |

FOREIGN PATENT DOCUMENTS

| | | | |
|---|---|---|---|
| CN | 105589506 A | 5/2016 | |
| CN | 303710762 S | 6/2016 | |
| CN | 106933468 A | 7/2017 | |
| CN | 107153537 A | 9/2017 | |
| CN | 109240791 A | 1/2019 | |
| CN | 109388468 A | 2/2019 | |
| CN | 110417991 A | 11/2019 | |
| CN | 110727382 A | 1/2020 | |
| JP | H04190390 A | 7/1992 | |
| WO | 2018155893 A1 | 8/2018 | |
| WO | 2020052529 A1 | 3/2020 | |

\* cited by examiner

APPLICATION WINDOW MANAGEMENT METHOD, TERMINAL DEVICE, AND COMPUTER-READABLE STORAGE MEDIUM

CROSS-REFERENCE TO RELATED APPLICATIONS

This application is a national stage of International Application No. PCT/CN2021/080231, filed Mar. 11, 2021, which claims priority to Chinese Patent Application No. 202010346737.4, filed Apr. 27, 2020. Both of the aforementioned applications are hereby incorporated by reference in their entireties.

TECHNICAL FIELD

This application relates to the field of terminal technologies, and in particular, to an application window management method, a terminal device, and a computer-readable storage medium.

BACKGROUND

With continuous improvement of intelligent terminal performance, most existing intelligent terminals can simultaneously run a plurality of applications (application, APP), and support a user in opening a plurality of application windows for a same application. To manage application windows opened by the user, the existing intelligent terminal provides a multi-task management service. When the user starts the multi-task management service, a terminal device displays, on a multi-task management interface, all the application windows opened by the user.

However, an existing multi-task management service cannot enable the user to intuitively learn, from the multi-task management interface, a quantity of application windows corresponding to an application to which each application window belongs, and cannot enable the user to quickly view, on the multi-task management interface, all application windows corresponding to an application corresponding to a plurality of application windows.

SUMMARY

This application provides an application window management method, a terminal device, and a computer-readable storage medium, to resolve a problem that an existing multi-task management service cannot enable a user to intuitively learn, from a multi-task management interface, a quantity of application windows corresponding to an application to which each application window belongs, and cannot enable the user to quickly view, on the multi-task management interface, all application windows corresponding to an application corresponding to a plurality of application windows.

To achieve the foregoing objective, this application uses the following technical solutions.

According to a first aspect, this application provides an application window management method, including:
  displaying, on a multi-task management interface, an application window corresponding to an application in a running state;
  displaying, at a second preset location of an application window corresponding to a first application, a multi-window identifier corresponding to the first application, where the first application is an application that corresponds to at least two application windows and that is in the application in a running state; and
  if it is detected that any one of the multi-window identifiers is triggered, displaying, on the multi-task management interface, all application windows corresponding to in only a first application corresponding to the triggered multi-window identifier.

In this embodiment, the multi-window identifier is displayed at the second preset location of the application window corresponding to the first application on the multi-task management interface, to inform a user that an application to which an application window displaying the multi-window identifier belongs corresponds to a plurality of application windows, and an application to which an application window not displaying the multi-window identifier belongs corresponds to only one application window. In this case, the user can intuitively learn, by checking whether the multi-window identifier is displayed, a quantity of application windows corresponding to an application to which each application window belongs. In addition, the user can quickly view, by triggering the multi-window identifier, all application windows corresponding to the first application corresponding to the multi-window identifier triggered by the user. This helps the user quickly find, from all the application windows corresponding to the first application, an application window that the user wants to open. Therefore, application window search efficiency is improved.

In a possible implementation of the first aspect, the displaying, on a multi-task management interface, an application window corresponding to an application in a running state includes:
  independently displaying, on the multi-task management interface, each application window corresponding to an application in a running state; and
  correspondingly, the displaying, at a second preset location of an application window corresponding to a first application, a multi-window identifier corresponding to the first application includes:
  displaying, at a second preset location of each application window corresponding to the first application, the multi-window identifier corresponding to the first application.

In this embodiment, each application window corresponding to each application in a running state is independently displayed on the multi-task management interface. This helps the user quickly open any application window displayed on the multi-task management interface.

In a possible implementation of the first aspect, the displaying, on a multi-task management interface, an application window corresponding to an application in a running state includes:
  displaying, on the multi-task management interface in a combination manner, at least two application windows corresponding to each first application, and independently displaying a single application window corresponding to each second application, where the second application is an application that corresponds to only one application window and that is in the application in a running state; and
  correspondingly, the displaying, at a second preset location of an application window corresponding to a first application, a multi-window identifier corresponding to the first application includes:
  displaying, at a second preset location of a combination window corresponding to the first application, the multi-window identifier corresponding to the first application, where the combination window is formed by combining the at least two application windows corresponding to the first application.

In this embodiment, the at least two windows corresponding to each first application are displayed in a combination manner on the multi-task management interface. This helps the user more intuitively learn, on the multi-task management interface, an application that corresponds to a plurality of application windows and an application that corresponds to only one application window. Therefore, display space of the multi-task management interface can be reduced.

In a possible implementation of the first aspect, after displaying, on the multi-task management interface, the application window corresponding to the application in a running state, the application window management method further includes:

displaying, at a first preset location of each application window, an application identifier of an application that corresponds to the application window belongs.

In a possible implementation of the first aspect, after displaying, on the multi-task management interface, the application window corresponding to the application in a running state, the application window management method further includes:

displaying, at a first preset location of the combination window corresponding to the first application, an application identifier of the first application, and displaying, at a first preset location of the single application window corresponding to the second application, an application identifier of the second application.

In this embodiment, an application identifier of an application to which each application window belongs is displayed on the multi-task management interface. This helps the user intuitively learn the application to which each application window belongs.

In a possible implementation of the first aspect, a display area corresponding to the second preset location overlaps a display area corresponding to the first preset location.

In a possible implementation of the first aspect, a display area corresponding to the second preset location does not overlap a display area corresponding to the first preset location.

In a possible implementation of the first aspect, after displaying, on the multi-task management interface in a combination manner, at least two application windows corresponding to each first application, and independently displaying a single application window corresponding to each second application, the application window management method further includes:

if it is detected that any one of the combination windows is triggered, displaying, on the multi-task management interface, all application windows corresponding to only the triggered combination window.

In this embodiment, a plurality of application windows corresponding to the first application are displayed in a combination manner on the multi-task management interface, so that the user may control, by triggering a combination window corresponding to the first application, a terminal device to display all application windows corresponding to the first application. This helps the user quickly view, on the multi-task management interface, all application windows corresponding to any one of the first applications.

According to a second aspect, this application provides a terminal device, including:

a first display control unit, configured to display, on a multi-task management interface, an application window corresponding to an application in a running state;

a second display control unit, configured to display, at a second preset location of an application window corresponding to a first application, a multi-window identifier corresponding to the first application, where the first application is an application that corresponds to at least two application windows and that is in the application in a running state; and a third display control unit, configured to: if it is detected that any one of the multi-window identifiers is triggered, display, on the multi-task management interface, all application windows corresponding to only a first application corresponding to the triggered multi-window identifier.

According to a third aspect, this application provides a terminal device, including a memory, a processor, and a computer program that is stored in the memory and that can be run on the processor. When the processor executes the computer program, the application window management method according to the first aspect is implemented.

According to a fourth aspect, this application provides a computer-readable storage medium. The computer-readable storage medium stores a computer program. When the computer program is executed by a processor, the application window management method according to the first aspect is implemented.

According to a fifth aspect, this application provides a computer program product. When the computer program product is run on a terminal device, the terminal device is enabled to perform the application window management method according to any one possible implementation of the first aspect.

According to a sixth aspect, this application provides a chip system. The chip system includes a memory and a processor. The processor executes a computer program stored in the memory, to implement the application window management method according to any one possible implementation of the first aspect.

According to a seventh aspect, this application provides another chip system. The chip system includes a processor, the processor is coupled to a memory, and the processor executes a computer program stored in the memory, to implement the application window management method according to any one possible implementation of the first aspect.

It may be understood that for advantageous effects of the second aspect to the seventh aspect, refer to the related descriptions in the first aspect. Details are not described herein again.

BRIEF DESCRIPTION OF THE DRAWINGS

To describe the technical solutions in embodiments of this application more clearly, the following briefly describes the accompanying drawings for describing embodiments or the conventional technology. It is clear that the accompanying drawings in the following description merely show some embodiments of this application, and a person of ordinary skill in the art can derive other drawings from these accompanying drawings without creative efforts.

DETAILED DESCRIPTION OF ILLUSTRATIVE EMBODIMENTS

Figure 1:
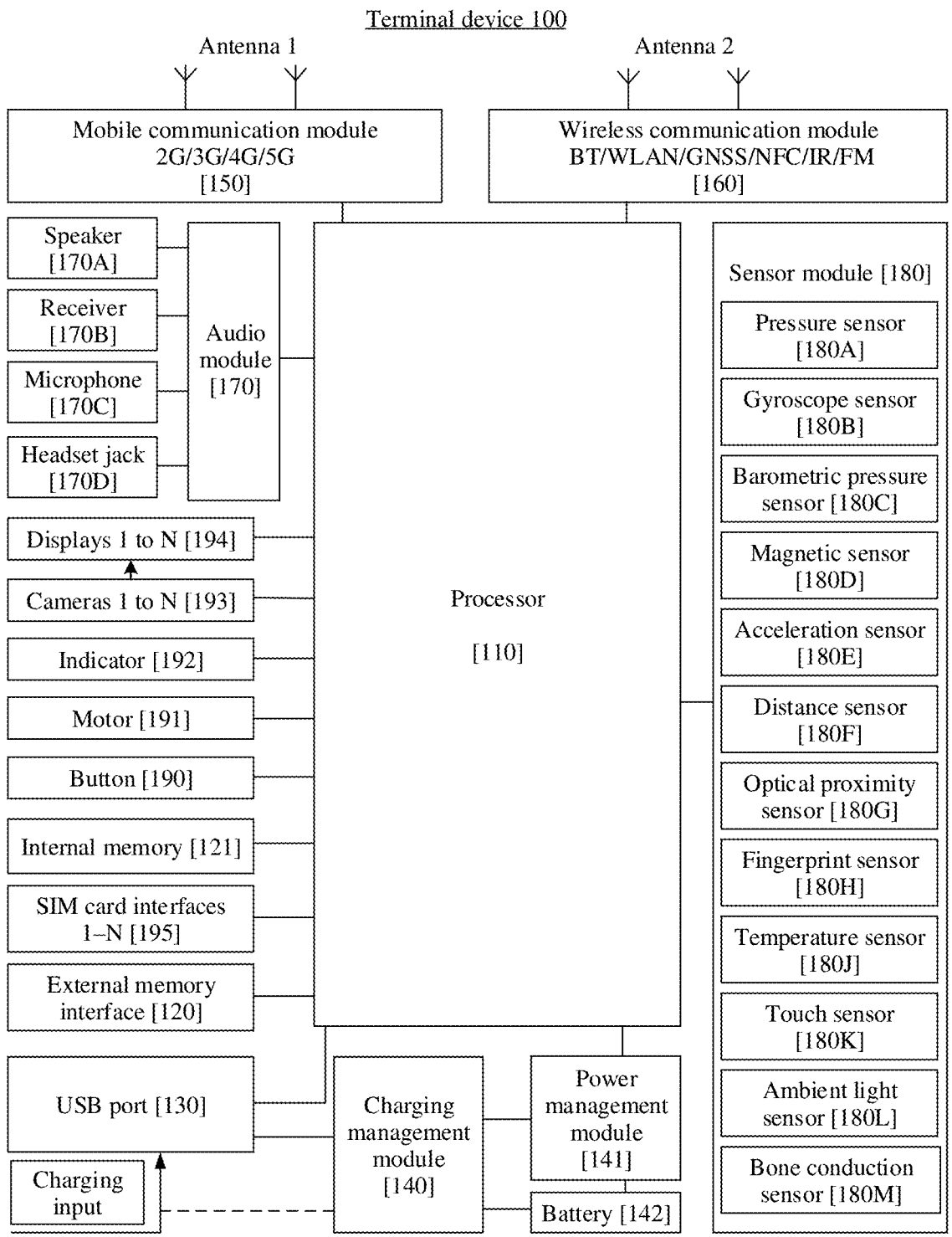
FIG. 1 is a schematic diagram of a hardware structure of a terminal device to which an application window management method is applied according to an embodiment of this application.

In the following description, for illustration instead of limitation, specific details such as a particular system structure and a technology are provided to facilitate a thorough understanding of embodiments of this application. However, a person skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, according to the context, the phrase "if it is determined that" or "if (a described condition or event) is detected" may be interpreted as a meaning of "once it is determined that" or "in response to determining" or "once (a described condition or event) is detected" or "in response to detecting (a described condition or event)".

In addition, in the specification and the appended claims of this application, the terms "first", "second", "third", and the like are merely used for distinguishing description, and shall not be understood as an indication or implication of relative importance.

Reference to "an embodiment", "some embodiments", or the like described in the specification of this application indicates that one or more embodiments of this application include a specific feature, structure, or characteristic described with reference to the embodiments. Therefore, in this specification, statements, such as "in an embodiment", "in some embodiments", "in some other embodiments", and "in other embodiments", that appear at different places do not necessarily mean reference to a same embodiment, instead, they mean "one or more but not all of the embodiments", unless otherwise specifically emphasized. The terms "include", "comprise", "have", and their variants all mean "include but are not limited to", unless otherwise specifically emphasized.

The application window management method provided in embodiments of this application is applicable to a terminal device. The terminal device may be a mobile terminal, for example, a mobile phone, a tablet computer, a laptop, a desktop computer, a vehicle-mounted device, an augmented reality (augmented reality, AR)/virtual reality (virtual reality, VR) device, an ultra-mobile personal computer (ultra-mobile personal computer, UMPC), a netbook computer, or a personal digital assistant (personal digital assistant, PDA). A specific type of the terminal device is not specially limited in embodiments of this application.

FIG. 1 is a schematic diagram of a hardware structure of a terminal device to which an application window management method is applied according to an embodiment of this application. Specifically, a terminal device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 18H, a temperature sensor 180J, a touch sensor 180K, an ambient light sensor 180L, a bone conduction sensor 180M, and the like.

It can be understood that, a structure illustrated in this embodiment of this application does not constitute a specific limitation on the terminal device 100. In some other embodiments of this application, the terminal device 100 may include more or fewer parts than those shown in the figure, or combine some parts, or split some parts, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through an I2C interface, so that the processor 110 communicates with the touch sensor 180K through the I2C bus interface to implement a touch function of the terminal device 100.

The I2S interface may be configured to perform audio communication. In some embodiments, the processor 110 may include a plurality of groups of I2S buses. The processor no may be coupled to the audio module 170 through the I2S bus, to implement communication between the processor 110 and the audio module 170. In some embodiments, the audio module 170 may transmit an audio signal to a wireless communication module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI may be configured to connect the processor 110 to peripheral components such as the display 194 and the camera 193. The MIPI includes a camera serial interface (camera serial interface, CSI), a display serial interface (display serial interface, DSI), and the like. In some embodiments, the processor 110 communicates with the camera 193 through the CSI interface, to implement a photographing function of the terminal device 100. The processor 110 communicates with the display 194 through the DSI interface, to implement a display function of the terminal device 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI, or the like.

The USB port 130 is an interface that conforms to a USB standard specification, and may be specifically a mini-USB port, a micro-USB port, a USB Type C port, or the like. The USB port 130 may be used to connect to the charger to charge the terminal device 100, or may be used to transmit data between the terminal device 100 and a peripheral device, or may be configured to connect to a headset for playing audio through the headset. The interface may be further configured to connect to another electronic device, for example, an AR device.

It can be understood that an interface connection relationship between the modules illustrated in this embodiment of this application is merely an example for description, and does not constitute a limitation on the structure of the terminal device 100. In some other embodiments of this application, the terminal device 100 may alternatively use different interface connection manners in the foregoing embodiments or a combination of a plurality of interface connection manners.

The charging management module 140 is configured to receive a charging input from the charger. The charger may be a wireless charger or a wired charger. In some embodiments of wired charging, the charging management module 140 may receive charging input from a wired charger through the USB port 130. In some embodiments of wireless charging, the charging management module 140 may receive wireless charging input by using a wireless charging coil of the terminal device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be configured to monitor parameters such as a battery capacity, a battery cycle count, and a battery state of health (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the terminal device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution applied to the terminal device 100, including 2G, 3G, 4G, 5G, or the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as a mobile communication module 150 or another functional module.

The wireless communication module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the terminal device 100. The wireless communication module 160 may be one or more components integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communication module 150, and the antenna 2 thereof is coupled to the wireless communication module 160, so that the terminal device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GNSS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The terminal device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute a program instruction to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the terminal device 100 may include one or N displays 194, where N is a positive integer greater than 1.

The terminal device 100 may implement a photographing function by using the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the terminal device 100 may include one or N cameras 193, where N is a positive integer greater than 1.

The digital signal processor is configured to process a digital signal, and may process another digital signal in addition to the digital image signal. For example, when the terminal device 100 selects a frequency, the digital signal processor is configured to perform Fourier transform on frequency energy.

The video codec is configured to compress or decompress a digital video. The terminal device 100 may support one or more types of video codecs. In this way, the terminal device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) processing unit. The NPU quickly processes input information by referring to a structure of a biological neural network, for example, a transfer mode between human brain neurons, and may further continuously perform self-learning. Applications such as intelligent cognition of the terminal device 100, for example, image recognition, facial recognition, speech recognition, and text understanding, can be implemented by using the NPU.

The external memory interface 120 may be configured to connect to an external memory card, for example, a micro-SD card, to extend a storage capability of the terminal device 100. The external memory card communicates with the processor 110 through the external memory interface 120, to implement a data storage function. For example, files such as music and videos are stored in the external memory card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (for example, audio data or a phone book) created in a process of using the terminal device 100. In addition, the internal memory 121 may include a high speed random access memory, or may include a nonvolatile memory, for example, at least one magnetic disk storage device, a flash memory, or a universal flash storage (universal flash storage, UFS). The processor 110 performs various function applications and data processing of the terminal device 100 by running the instructions stored in the internal memory 121 and/or the instructions stored in the memory disposed in the processor.

The terminal device 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal device 100 may listen to music or answer a call in a hands-free mode over the speaker 170A.

The receiver 170B, also referred to as an "earpiece", is configured to convert an audio electrical signal into a sound signal. When a call is answered or voice information is received through the terminal device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth, to input a sound signal to the microphone 170C. At least one microphone 170C may be disposed in the terminal device 100. In some other embodiments, two microphones 170C may be disposed in the terminal device 100, to collect a sound signal and further implement a noise reduction function. In some other embodiments, three, four, or more microphones 170C may alternatively be disposed in the terminal device 100, to collect a sound signal, implement noise reduction, and identify a sound source, to implement a directional recording function and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When force is applied to the pressure sensor 180A, capacitance between electrodes changes. The terminal device 100 determines pressure strength based on a capacitance change. When a touch operation is performed on the display 194, the terminal device 100 detects strength of the touch operation by using the pressure sensor 180A. The terminal device 100 may further calculate a touch position based on a detection signal of the pressure sensor 180A. In some embodiments, touch operations that are performed in a same touch location but have different touch operation intensity may correspond to different operation instructions. For example, when a touch operation whose touch operation intensity is less than a first pressure threshold is performed on an SMS message application icon, an instruction for viewing an SMS message is performed. When a touch operation whose touch operation intensity is greater than or equal to the first pressure threshold is performed on the SMS message application icon, an instruction for creating a new SMS message is performed.

The gyroscope sensor 180B may be configured to determine a motion posture of the terminal device 100. In some embodiments, angular velocities of the terminal device 100 around three axes (namely, x, y, and z axes) may be determined by using the gyroscope sensor 180B. The gyroscope sensor 180B may be configured to implement image stabilization during photographing. For example, when the shutter is pressed, the gyroscope sensor 180B detects an angle at which the terminal device 100 jitters, calculates, based on the angle, a distance for which a lens module needs to compensate, and allows the lens to cancel the jitter of the terminal device 100 through reverse motion, to implement image stabilization. The gyroscope sensor 180B may also be used in a navigation scenario and a somatic game scenario.

The barometric pressure sensor 180C is configured to measure barometric pressure. In some embodiments, the terminal device 100 calculates an altitude by using a barometric pressure value measured by the barometric pressure sensor 180C, to assist in positioning and navigation.

The magnetic sensor 180D includes a Hall effect sensor. The terminal device 100 may detect opening and closing of a flip cover by using the magnetic sensor 180D. In some embodiments, when the terminal device 100 is a flip phone, the terminal device 100 may detect opening and closing of a flip cover based on the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the terminal device 100. A magnitude and a direction of gravity may be detected when the terminal device 100 is stationary. The acceleration sensor 180E may be further configured to identify a posture of the electronic device, and is used in an application such as switching between a landscape mode and a portrait mode or a pedometer.

The distance sensor 180F is configured to measure a distance. The terminal device 100 may measure a distance by using infrared light or a laser. In some embodiments, in a photographing scenario, the terminal device 100 may measure a distance by using the distance sensor 180F, to implement fast focusing.

The optical proximity sensor 180G may include, for example, a light-emitting diode (LED) and an optical detector, for example, a photodiode. The light-emitting diode may be an infrared light-emitting diode. The terminal device 100 emits infrared light outward by using the light-emitting diode. The terminal device 100 detects infrared reflected light from a nearby object by using the photodiode. When sufficient reflected light is detected, the terminal device 100 may determine that there is an object near the terminal device 100. When insufficient reflected light is detected, the terminal device 100 may determine that there is no object near the terminal device 100. The terminal device 100 may detect, by using the optical proximity sensor 180G, that the user holds the terminal device 100 close to an ear for a call, to automatically turn off a screen for power saving. The optical proximity sensor 180G may also be used for automatic screen unlocking and locking in a smart cover mode or a pocket mode.

The ambient light sensor 180L is configured to sense ambient light brightness. The terminal device 100 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device 100 is in a pocket, to prevent accidental touch.

The fingerprint sensor 180H is configured to collect a fingerprint. The terminal device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device 100 executes a temperature processing policy by using the temperature detected by the temperature sensor 180J. For example, when the temperature reported by the temperature sensor 180J exceeds a threshold, the terminal device 100 reduces performance of a processor located near the temperature sensor 180J, to reduce power consumption and implement heat protection. In some other embodiments, when the temperature is lower than another threshold, the terminal device 100 heats the battery 142, to avoid abnormal shutdown of the terminal device 100 caused by a low temperature. In some other embodiments, when the temperature is lower than still another threshold, the terminal device 100 boosts an output voltage of the battery 142, to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal device 100 at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The terminal device 100 may receive button input, and generate button signal input related to a user setting and function control of the terminal device 100.

The motor 191 may generate a vibration prompt. The motor 191 may be configured to provide an incoming call vibration prompt and a touch vibration feedback. For example, touch operations performed on different applications (for example, photographing and audio playback) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal device 100. The terminal device 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 is also compatible with an external memory card. The terminal device 100 interacts with a network through the SIM card, to implement functions such as calling and data communication. In some embodiments, the terminal device 100 uses an eSIM card, namely, an embedded SIM card. The eSIM card may be embedded in the terminal device 100, and cannot be separated from the terminal device 100.

A software system of the terminal device 100 may use a layered architecture, an event-driven architecture, a microkernel architecture, a microservice architecture, or a cloud architecture. In this embodiment of this application, an Android system with a layered architecture is used as an example to describe a software structure of the terminal device 100.

Figure 2:
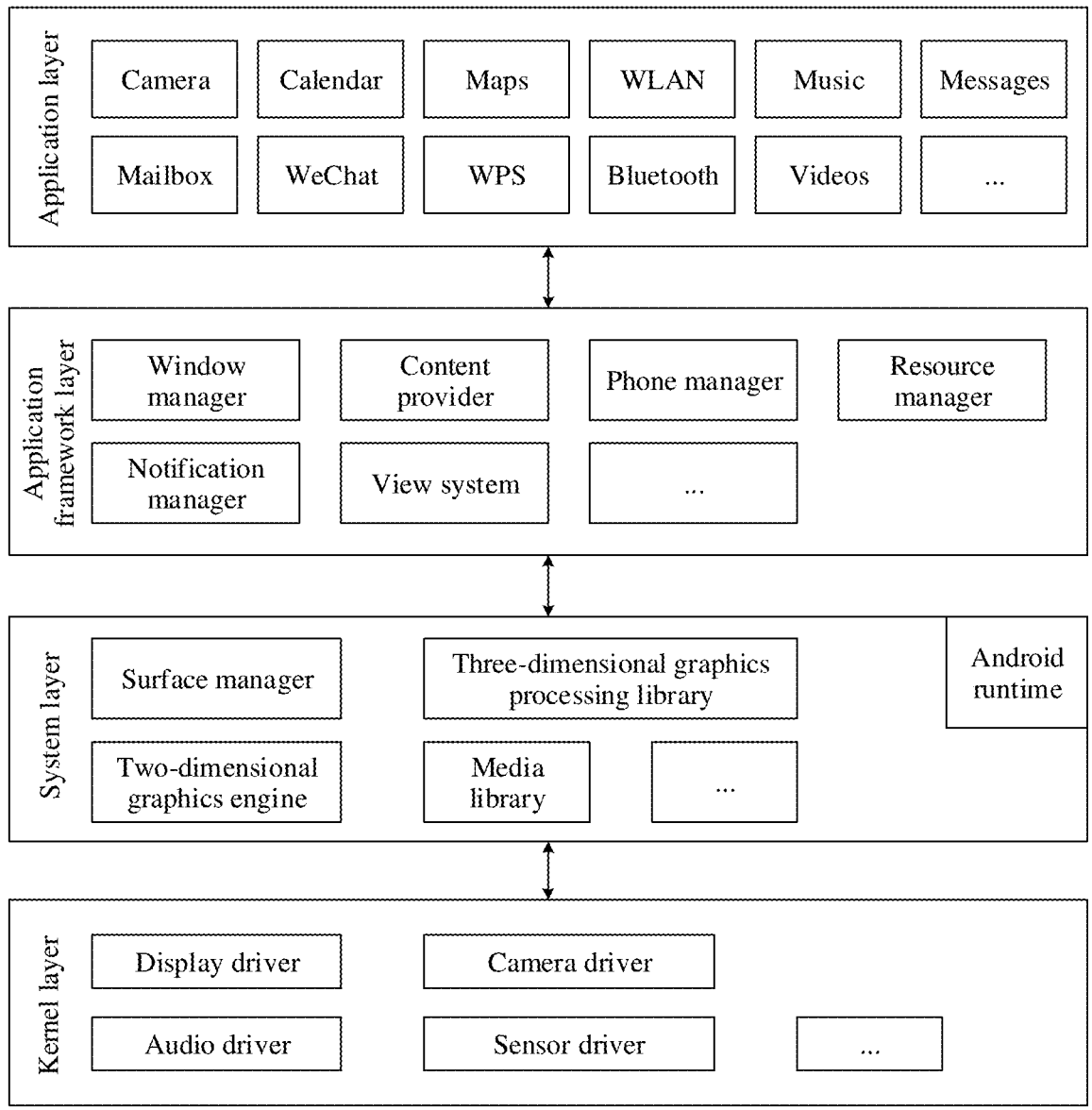
FIG. 2 is a block diagram of a software structure of a terminal device to which an application window management method is applied according to an embodiment of this application.

FIG. 2 is a block diagram of a software structure of a terminal device to which an application window management method is applied according to an embodiment of this application. As shown in FIG. 2, a layered architecture divides software into several layers, each with a clear role and division of labor. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as Camera, Mailbox, Calendar, WeChat, Maps, WPS, WLAN, Bluetooth, Music, Videos, and Messages.

The application framework layer provides an application programming interface (application programming interface, API) and a programming framework to an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of the display, determine whether there is a status bar, perform screen locking, take a screenshot, and the like.

The content provider is configured to store and obtain data, and enable the data to be accessed by an application. The data may include a video, an image, audio, calls that are made and answered, a browsing history and bookmarks, an address book, and the like.

The view system includes visual controls such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the terminal device 100, for example, management of call statuses (including answering, declining, and the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is prompted in the status bar, a prompt tone is produced, the terminal device vibrates, or an indicator light blinks.

The Android runtime includes a core library and a virtual machine. The Android runtime is responsible for scheduling and management of the Android system.

The core library includes two parts: a function that needs to be invoked in java language, and a core library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a two-dimensional graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, compositing, layer processing, and the like.

The two-dimensional graphics engine is a drawing engine for 2D drawing.

The kernel layer is a layer between hardware and software. The kernel layer includes at least a display driver, a camera driver, an audio driver, and a sensor driver.

First, a multi-task management service in embodiments of this application is described.

The multi-task management service is used to manage and display an application window corresponding to an application in a running state. The application in a running state may include but is not limited to an application running in a foreground and an application running in a background. The application window corresponding to the application in a running state is an application window that is opened by a user and that is of the application.

It should be noted that in embodiments of this application, a terminal device supports the user in opening a plurality of application windows for a same application. When the user opens a plurality of application windows of an application, the plurality of application windows may be respectively used to display different content of the application, or may be used to display same content of the application. A memo is used as an example, when the user creates a plurality of pieces of different memo information in the memo, to help the user view the plurality of pieces of memo information at the same time, the user may open a plurality of application windows of the memo, so that different memo information is displayed in different application windows of the memo. In this way, the user may view different memo information by switching different application windows of the memo.

In embodiments of this application, when at least two application windows of an application are opened by the user, the terminal device may mark the application as a first application. When only one application window of an application is opened by the user, the terminal device may mark the application as a second application. An application window opened by the user may include but is not limited to an application window opened by the user in a mode of full screen, split screen, a floating box, a floating ball, or the like.

An existing Android system, an IOS system, a Windows system, and the like each provide a multi-task management service. When the multi-task management service is started by a user, a multi-task management interface is displayed, and all application windows corresponding to all applications in a running state are displayed on the multi-task management interface. In this way, when an application includes a plurality of application windows, if the user wants to search, on the multi-task management interface, for one of the application windows corresponding to the application, the user needs to search, one by one, all the application windows displayed on the multi-task management interface, and therefore, search efficiency is relatively low.

For the foregoing defects in the multi-task management services provided by the existing Android system, IOS system, and Windows system, an embodiment of this application provides an application window management method, so that a user can intuitively learn, from a multi-task management interface, a quantity of application windows corresponding to an application to which each application window belongs. This helps the user quickly view, on the multi-task management interface, all application windows corresponding to an application corresponding to a plurality of application windows.

It should be noted that a software system to which the application window management method provided in this embodiment of this application is applicable includes but is not limited to an Android system, an IOS system, and a Windows system. In this embodiment of this application, the Android system is used as an example to describe the application window management method.

Figure 3:
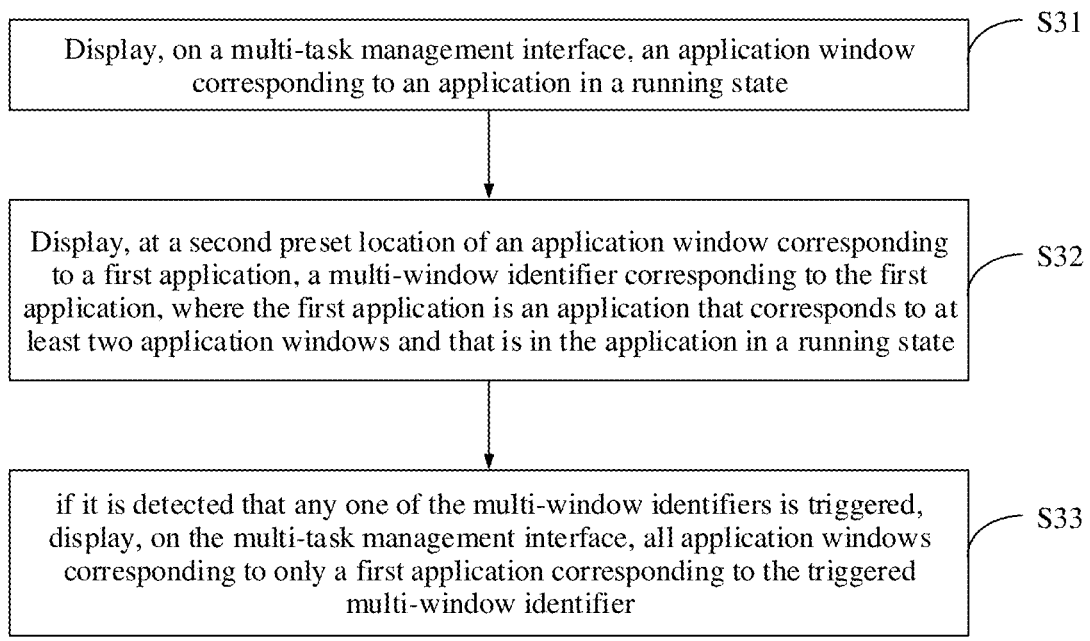
FIG. 3 is a schematic flowchart of an application window management method according to an embodiment of this application.

FIG. 3 is a schematic flowchart of an application window management method according to an embodiment of this application. As shown in FIG. 3, the application window management method may include S31 to S33. Details are as follows:

S31: Display, on a multi-task management interface, an application window corresponding to an application in a running state.

In this embodiment of this application, when a user wants to view an application window opened by the user, the user may control, by starting a multi-task management service of a terminal device, the terminal device to open the multi-task management interface.

In some embodiments of this application, the user may control, by triggering an entry of the multi-task management service, the terminal device to open the multi-task management interface. In some specific implementations, the entry of the multi-task management service may be an application icon, the application icon may be displayed at a location such as a taskbar or a desktop of the terminal device, and the user may control, by tapping the application icon, the terminal device to open the multi-task management interface. In some other specific implementations, the entry of the multi-task management service may alternatively be a floating ball, a floating window, or the like for the multi-task management service. The floating ball or the floating window may be displayed on any display interface of the terminal device in a floating manner. The user may control, by tapping the floating ball or the floating window, the terminal device to open the multi-task management interface.

In some other embodiments of this application, the user may further control, by triggering a preset shortcut key corresponding to the multi-task management service, the terminal device to open the multi-task management interface. The preset shortcut key may be a physical key or a virtual key. The preset shortcut key may be one key, or may be a combination of at least two keys. When the preset shortcut key is a key, triggering the preset key may include but is not limited to tapping/single tapping the key, double tapping the key, pressing the key heavily, pressing and holding the key, or the like. When the preset shortcut key is a combination of at least two keys, triggering the preset key may include but is not limited to simultaneously pressing or simultaneously tapping the at least two keys, or the like.

In still some embodiments of this application, the user may further control, by executing a preset shortcut gesture corresponding to the multi-task management service, the terminal device to open the multi-task management interface. The preset shortcut gesture may be a touch gesture for a display interface. For example, the preset shortcut gesture may be a swipe-up gesture starting from the bottom of the display interface.

In this embodiment of this application, when opening the multi-task management interface, the terminal device may display, on the multi-task management interface, the application window corresponding to the application in a running state.

In specific implementation, the terminal device may display, on the multi-task management interface in the following at least two implementations, the application window corresponding to the application in a running state:

First implementation: Each application window corresponding to the application in a running state is independently displayed on the multi-task management interface.

Figure 4A:
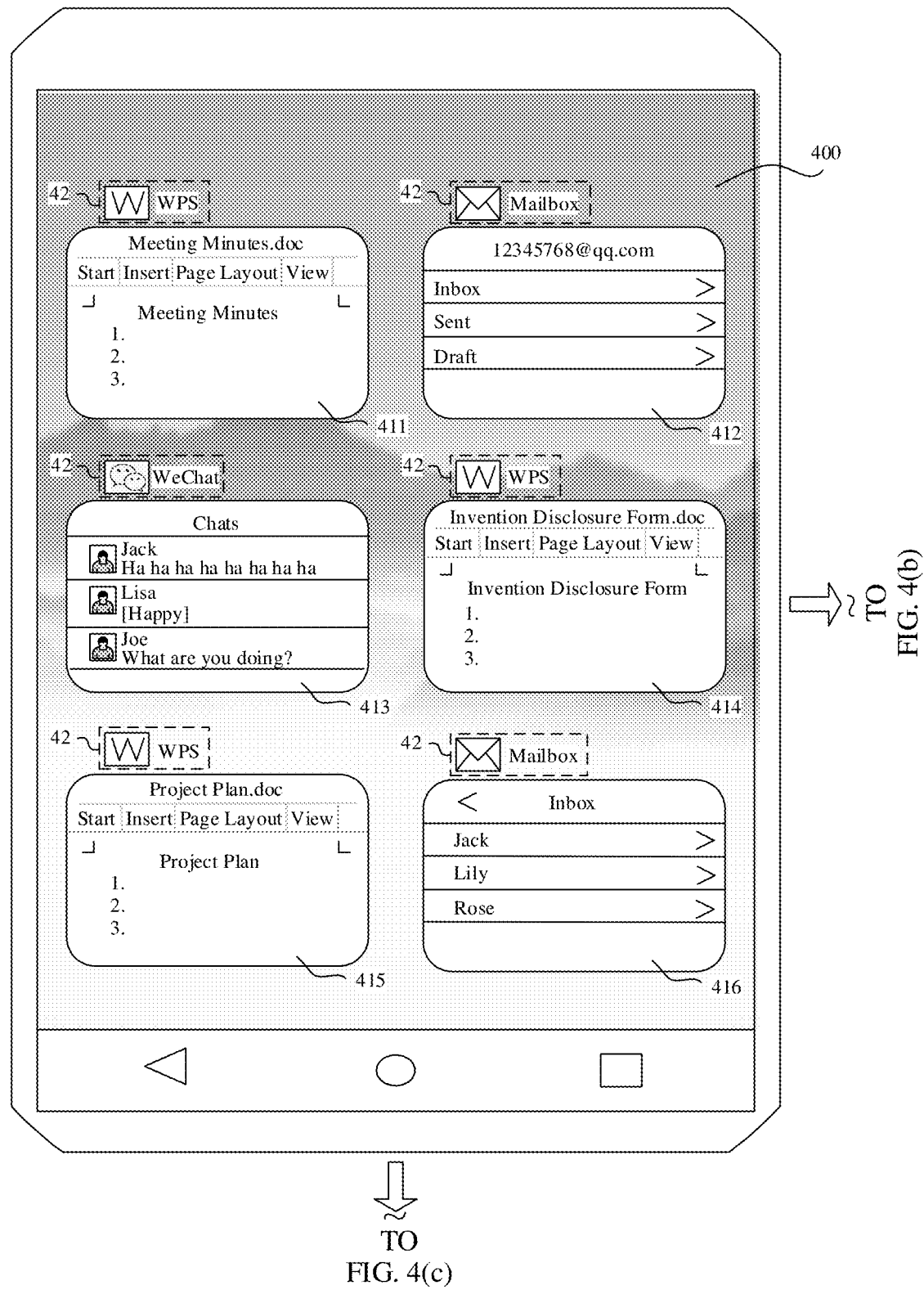
FIG. 4(a) to FIG. 4(d) are schematic interface diagrams of a multi-task management interface according to an embodiment of this application.
Figure 4B:
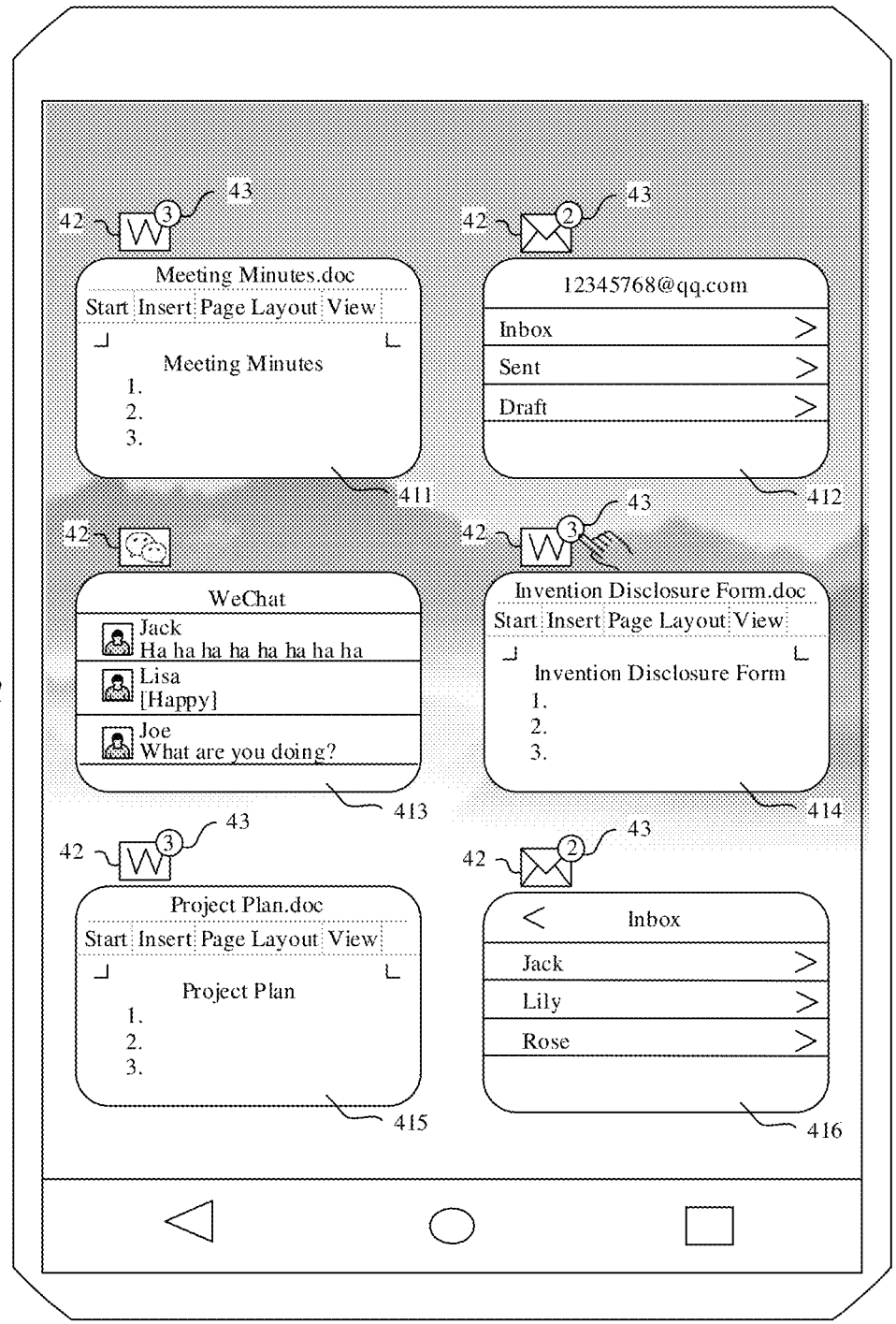
Figure 4C:
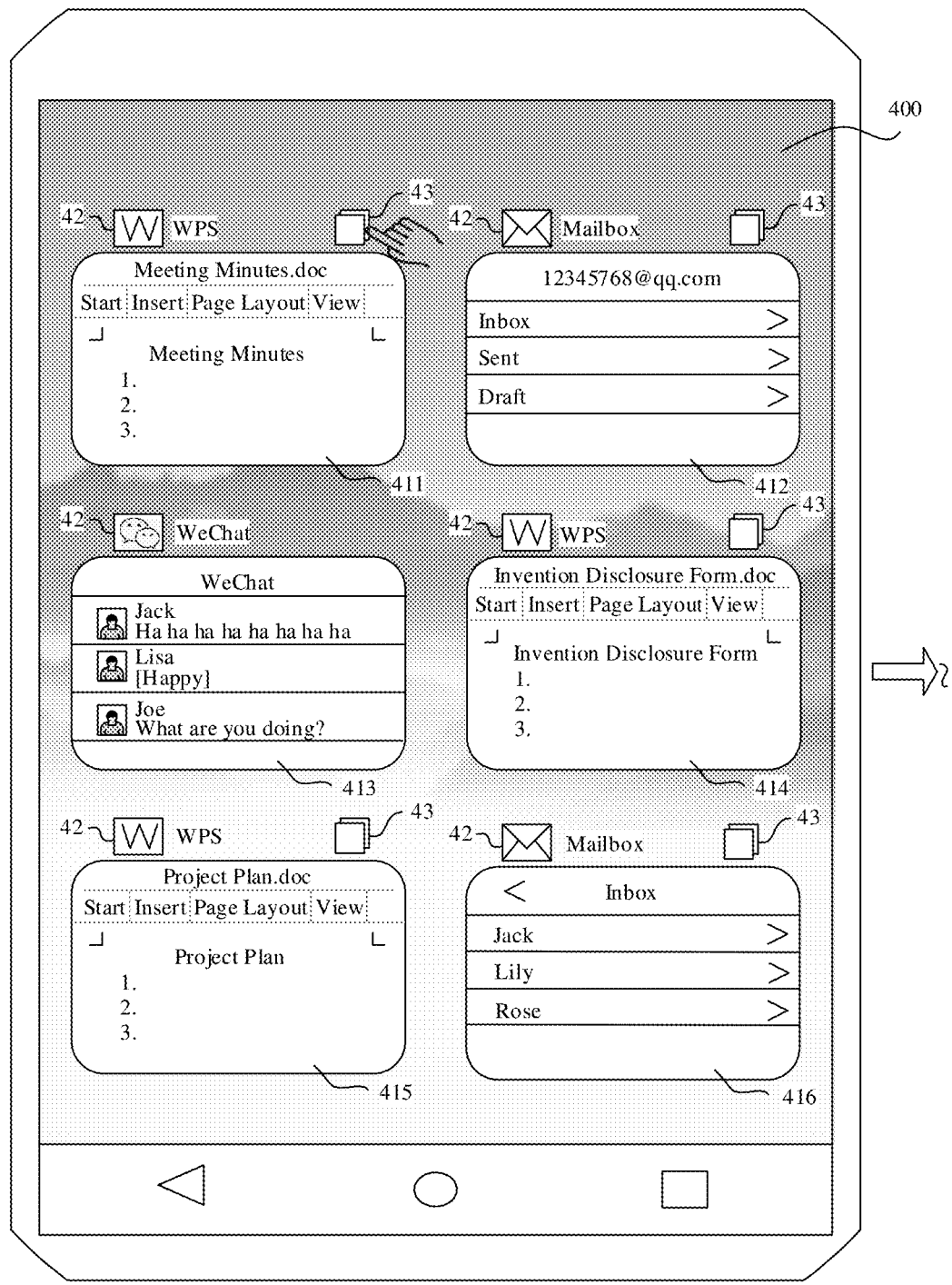
Figure 4D:
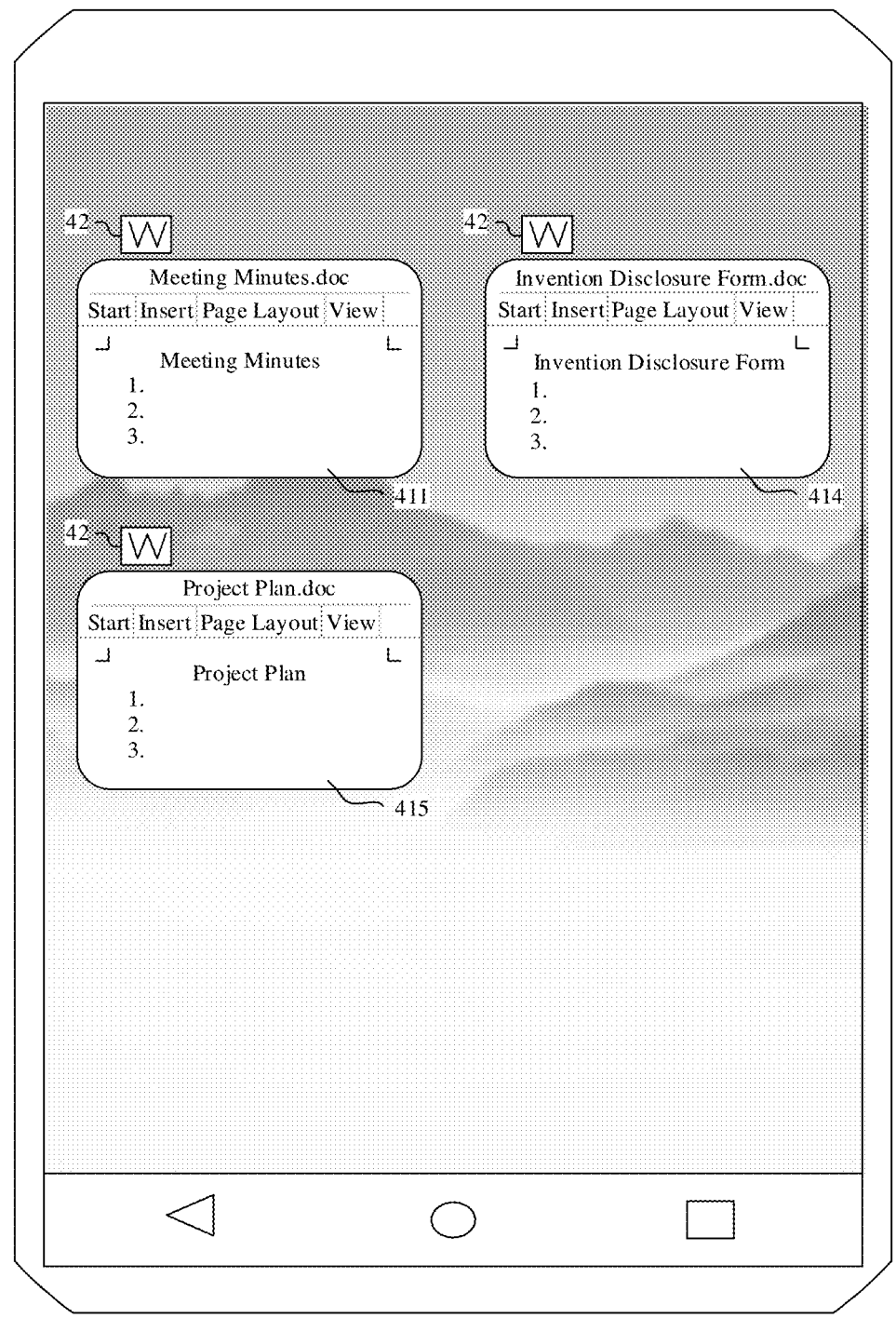

In this implementation, after the user opens the multi-task management interface, to enable the user to intuitively view general content displayed in each application window, the terminal device may independently display, on the multi-task management interface, each application window corresponding to each application in a running state. Independent display means that each application window is used as an independent small window on the multi-task management interface, that is, in this implementation, different application windows are independent of each other. For example, as shown in FIG. 4(a), FIG. 5(a), FIG. 6(a), or FIG. 7(a), it is assumed that applications in a running state correspond to WPS, Mailbox, and WeChat. WPS corresponds to three application windows: 411, 414, and 415. Mailbox corresponds to two application windows: 412 and 416. WeChat corresponds to one application window 413. As shown in FIG. 4(a), the terminal device may independently display the five application windows 411, 412, 413, 414, 415, and 416 on the multi-task management interface 400, that is, the application windows 411, 412, 413, 414, 415, and 416 are independent of each other.

In specific implementation, the terminal device may sequentially and independently display the application windows on the multi-task management interface in a preset arrangement manner according to the latest operation time corresponding to the application windows. The latest operation time refers to time at which the application window is last operated by the user. A preset arrangement sequence may be set according to an actual requirement. The preset arrangement sequence is not specially limited in this embodiment. By way of example, and not limitation, the preset arrangement manner may be arranging from a left side of a display interface to a right side of the display interface, and automatically wrapping lines. For example, as shown in FIG. 4(a), it is assumed that the latest operation time corresponding to the application window 411 is later than the latest operation time corresponding to the application window 412, the latest operation time corresponding to the application window 412 is later than the latest operation time corresponding to the application window 413, the latest operation time corresponding to the application window 413 is later than the latest operation time corresponding to the application window 414, the latest operation time corresponding to the application window 414 is later than the latest operation time corresponding to the application window 415, and the latest operation time corresponding to the application window 415 is later than the latest operation time corresponding to the application window 416. The terminal device may separately and independently display the application windows 411, 412, 413, 414, 415, and 416 on the multi-task management interface 400 according to an arrangement manner shown in FIG. 4(a).

Figure 5A:
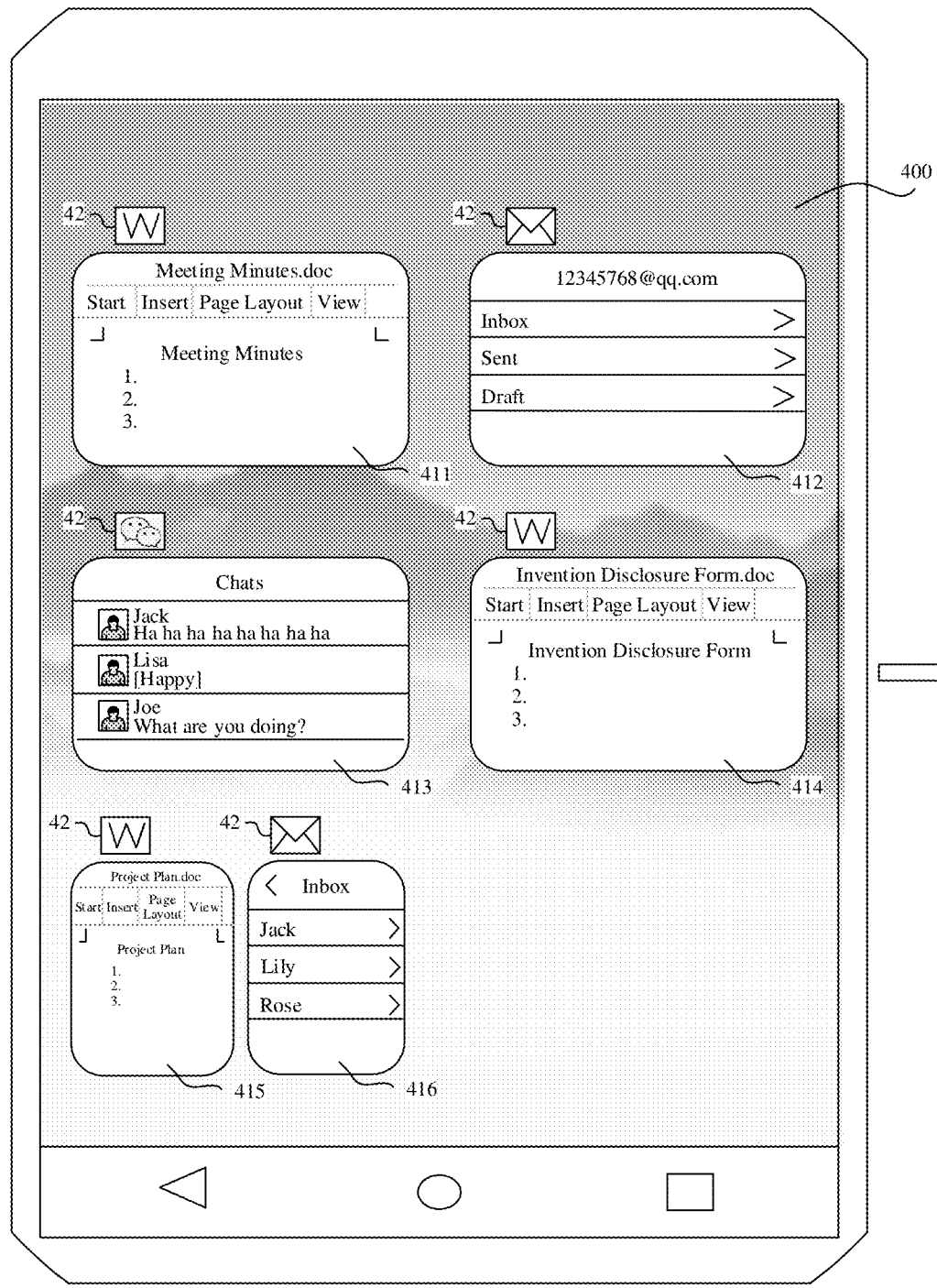
FIG. 5(a) to FIG. 5(d) are schematic interface diagrams of a multi-task management interface according to another embodiment of this application.
Figure 5B:
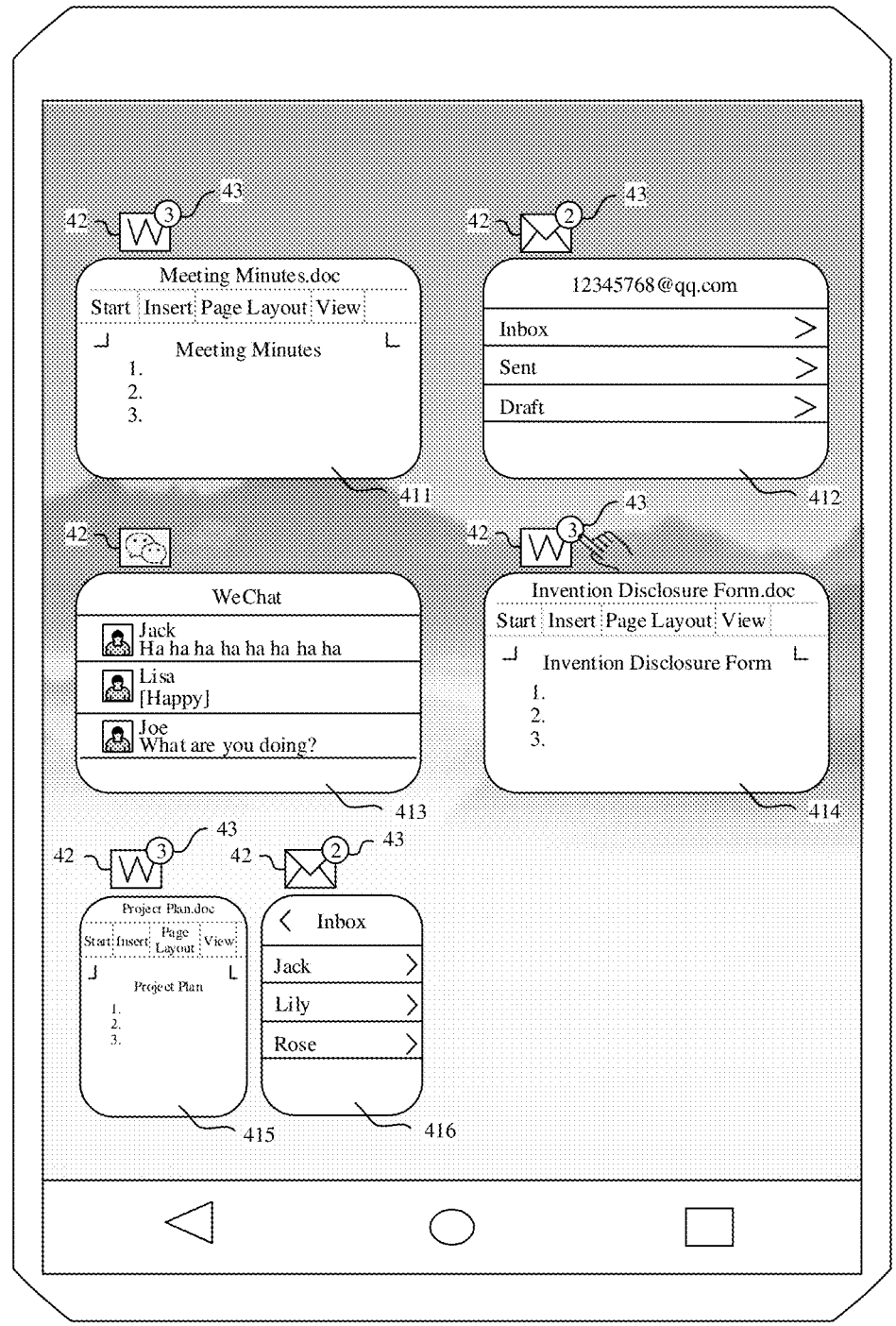
Figure 5C:
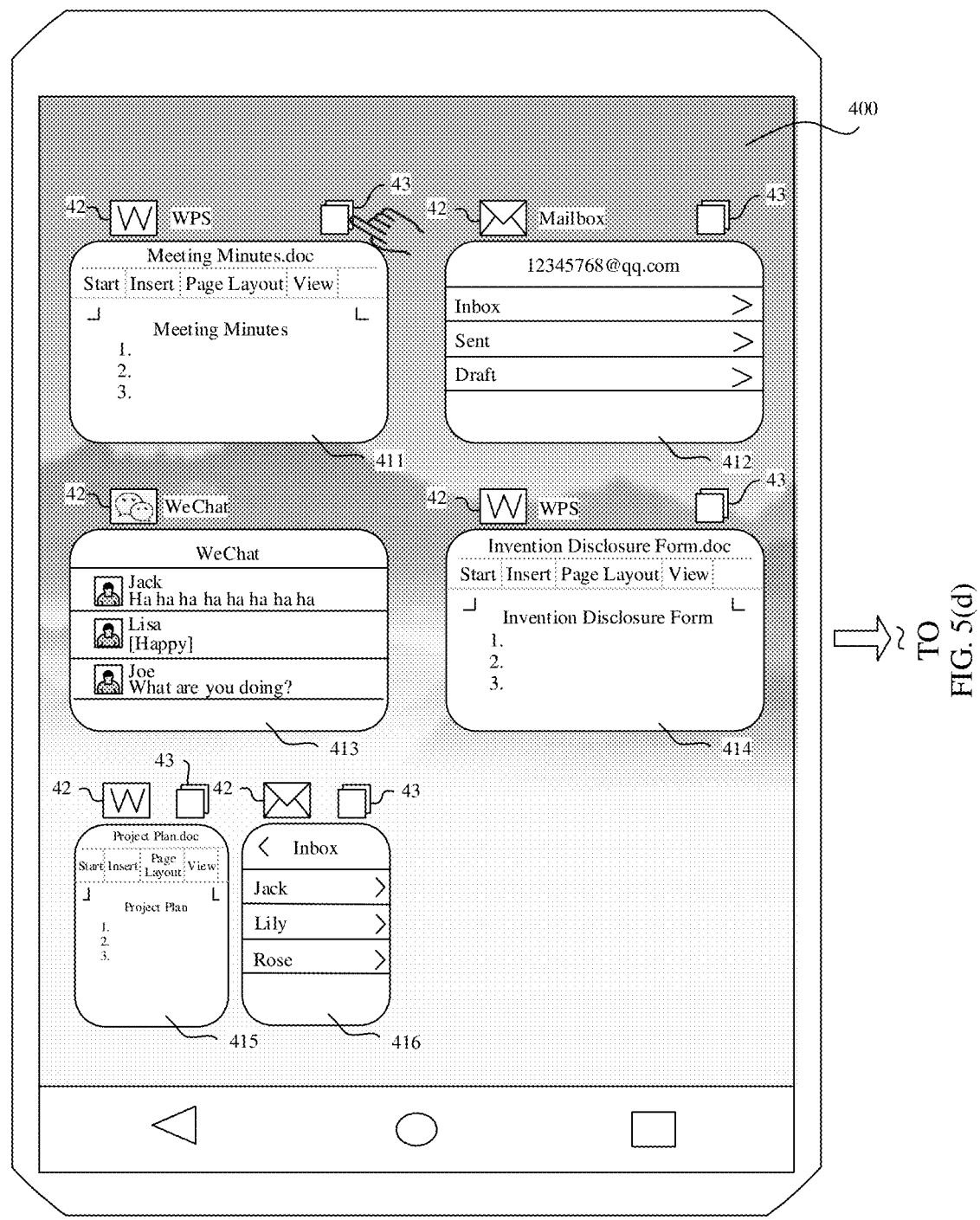
Figure 5D:
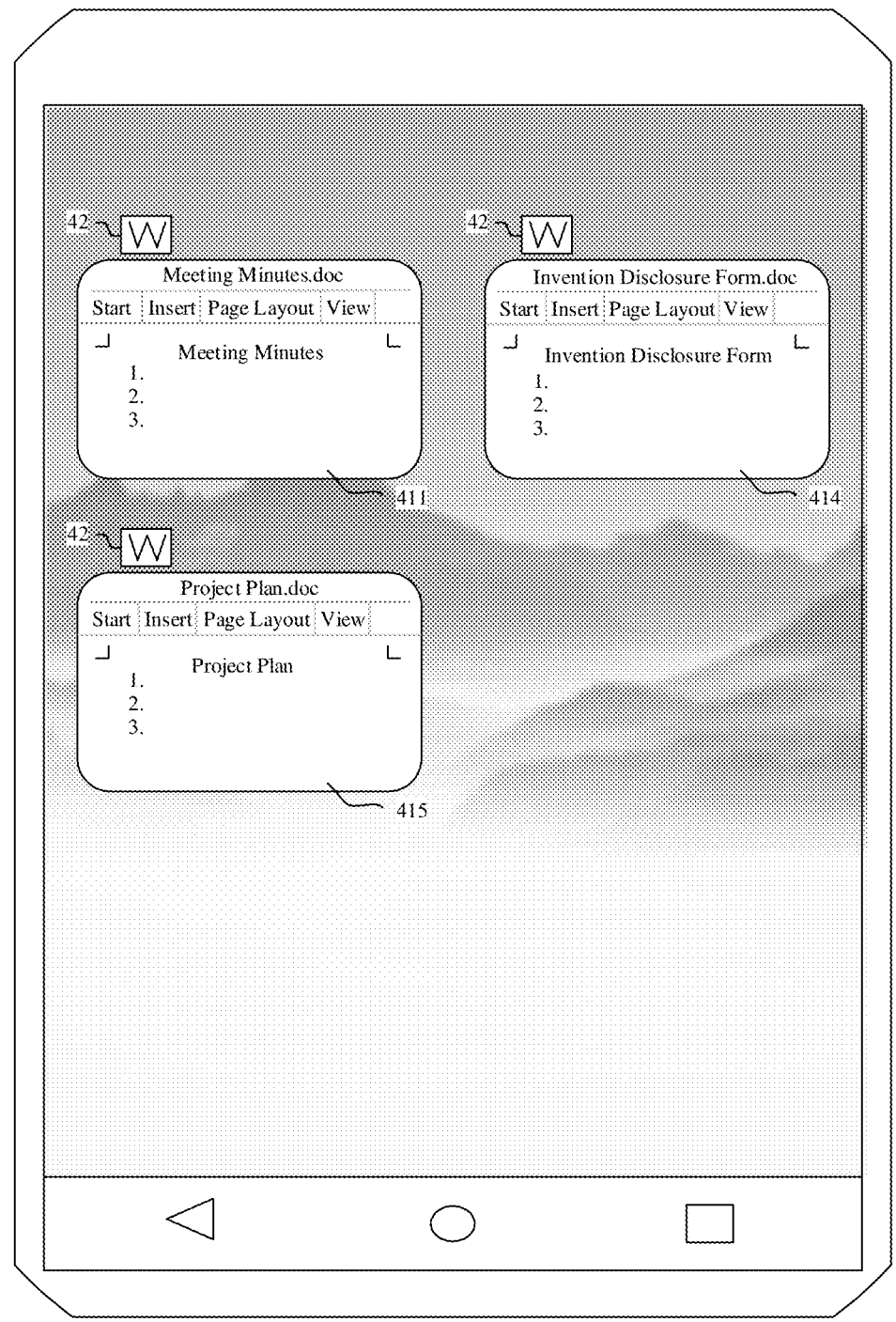

It should be noted that in this implementation, for an application window opened by the user in a full-screen manner, the terminal device may independently use the application window as an independent window on the multi-task management interface. For an application window opened by the user in a split-screen manner, the terminal device may jointly use at least two application windows displayed on split screens as an independent window on the multi-task management interface. For an application window opened by the user in a mode of a floating box or a floating ball, the terminal device may use the floating box or the floating ball as an independent window on the multi-task management interface, and display the corresponding application window in the floating box or the floating ball. For example, as shown in FIG. 5(a), it is assumed that the application window 415 corresponding to WPS and the application window 416 corresponding to Mailbox are opened by the user in a split-screen manner. The terminal device jointly displays the application window 415 and the application window 416 as an independent window on the multi-task management interface 400.

In this implementation, when the user triggers an application window on the multi-task management interface, if the triggered application window is an application window opened by the user in a full-screen mode, the terminal device exits the multi-task management interface, and displays the application window in full-screen mode in the foreground. If the triggered application window is an application window opened by the user in a split-screen mode, the terminal device exits the multi-task management interface, and displays the application window in a split-screen mode in the foreground. If the triggered application window is an application window opened by the user in a mode of a floating box or a floating ball, the terminal device exits the multi-task management interface, and displays the application window in a mode of a floating box or a floating ball in the foreground. For example, as shown in FIG. 4(a), it is assumed that the user triggers the application window 413 on the multi-task management interface 400. The terminal device exits the multi-task management interface and displays the application window 413 in a full-screen mode. It is assumed that the user triggers the application window 415 or 416 on the multi-task management interface 400. The terminal device exits the multi-task management interface and displays the application windows 415 and 416 in a split-screen mode.

Second implementation: On the multi-task management interface, at least two application windows corresponding to each first application are displayed in a combination manner, and a single application window corresponding to each second application is displayed independently.

In this implementation, a first application is an application that corresponds to at least two application windows and that is in the application in a running state, and the second application is an application that corresponds to only one application window and that is in the application in a running state.

To help the user more intuitively learn, on the multi-task management interface, an application that corresponds to a plurality of application windows and an application that corresponds to only one application window, and to reduce display space of the multi-task management interface, the terminal device may display, on the multi-task management interface, at least two application windows corresponding to the first application in a combination manner.

Displaying in a combination manner means that at least two application windows are cascaded into a combination window, and the combination window is used as an independent small window on the multi-task management interface. To be specific, in this implementation, application windows corresponding to different applications are independent of each other, and a plurality of application windows corresponding to a same application have an association relationship.

Figure 6A:
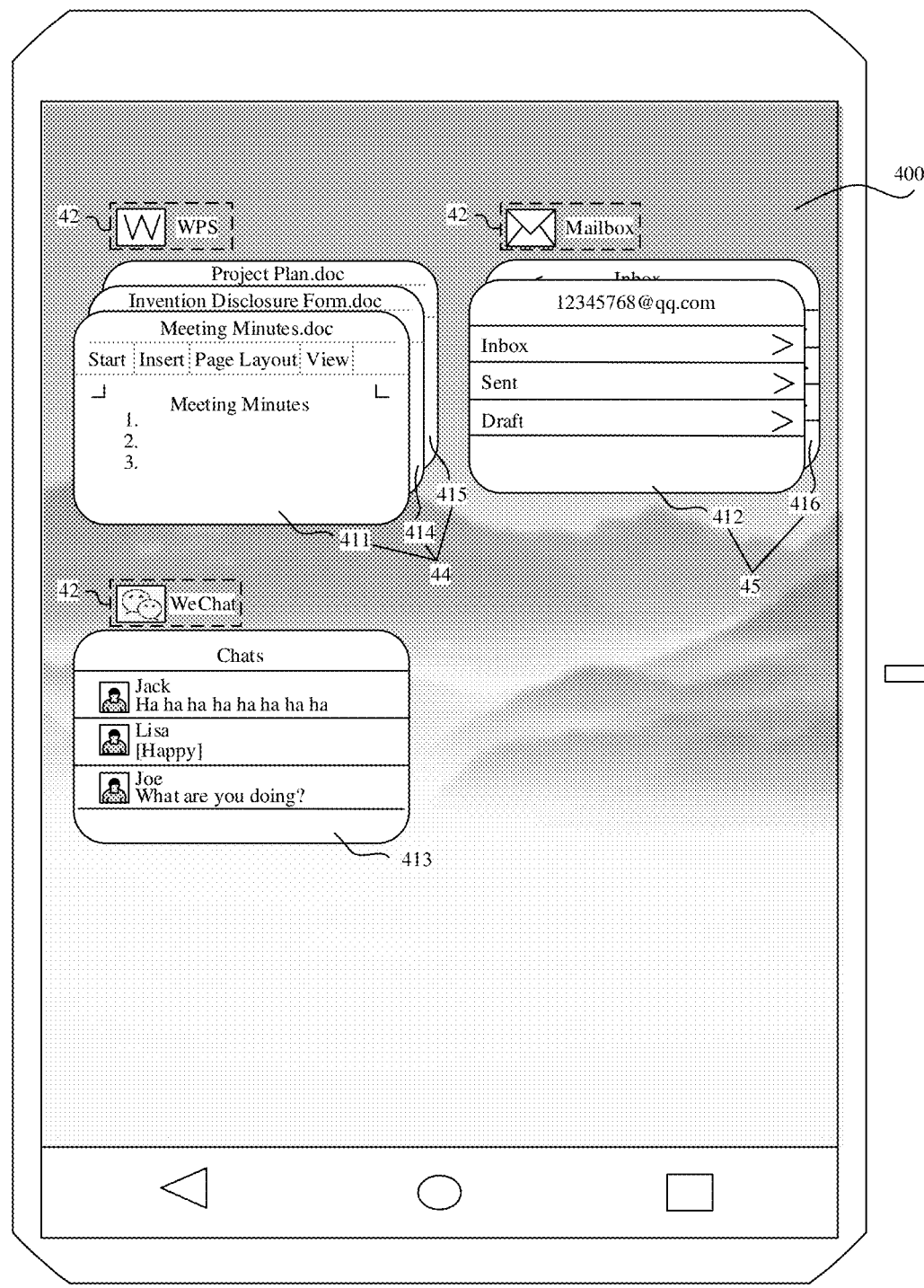
FIG. 6(a) to FIG. 6(d) are schematic interface diagrams of a multi-task management interface according to still another embodiment of this application.

In some specific implementations, display of at least two application windows in a combination manner may be display of the at least two application windows in a cascade manner. For example, as shown in FIG. 6(a), the terminal device may display three application windows 411, 414, and 415 corresponding to WPS in a cascade manner, display two application windows 412 and 416 corresponding to Mailbox in a cascade manner, and independently display one window 413 of an application corresponding to WeChat. It should be noted that the window 44 formed by combining the application windows 411, 414, and 415 is a combination window corresponding to the WPS, and the window 45 formed by combining the application windows 412 and 416 is a combination window corresponding to the WPS.

More specifically, when displaying at least two application windows in a cascade manner, the terminal device may display, on a topmost layer, an application window whose latest operation time is the latest in the at least two application windows, and display, on a bottommost layer, an application window whose latest operation time is earliest in the at least two application windows. For example, in the three application windows corresponding to WPS, the latest operation time corresponding to the application window 411 is the latest, and the latest operation time corresponding to the application window 415 is the earliest. Therefore, as shown in FIG. 6(a), when the terminal device displays the application windows 411, 414, and 415 in cascade mode, the terminal device may display the application window 411 at a topmost layer, display the application window 415 at a bottommost layer, and display the application window 414 between the application window 411 and the application window 415. In the two application windows corresponding to Mailbox, the latest operation time corresponding to the application window 412 is later than the latest operation time corresponding to the application window 416. Therefore, when the terminal device displays the application windows 412 and 416 in cascade mode, the terminal device may display the application window 412 on a topmost layer, and display the application window 416 on a bottommost layer. Certainly, in another implementation, the terminal device may alternatively display at least two application windows in another cascade manner. For example, the terminal device may further display, at a bottommost layer, an application window whose latest operation time is the latest in the at least two application windows, and display, at a topmost layer, an application window whose latest operation time is the earliest in the at least two application windows. A cascading display manner of the at least two application windows is not specially limited in this embodiment of this application.

In some other specific implementations, display of at least two application windows in a combination manner may also be display of the at least two application windows in a combined arrangement manner in an independent window on the multi-task management interface.

Figure 7A:
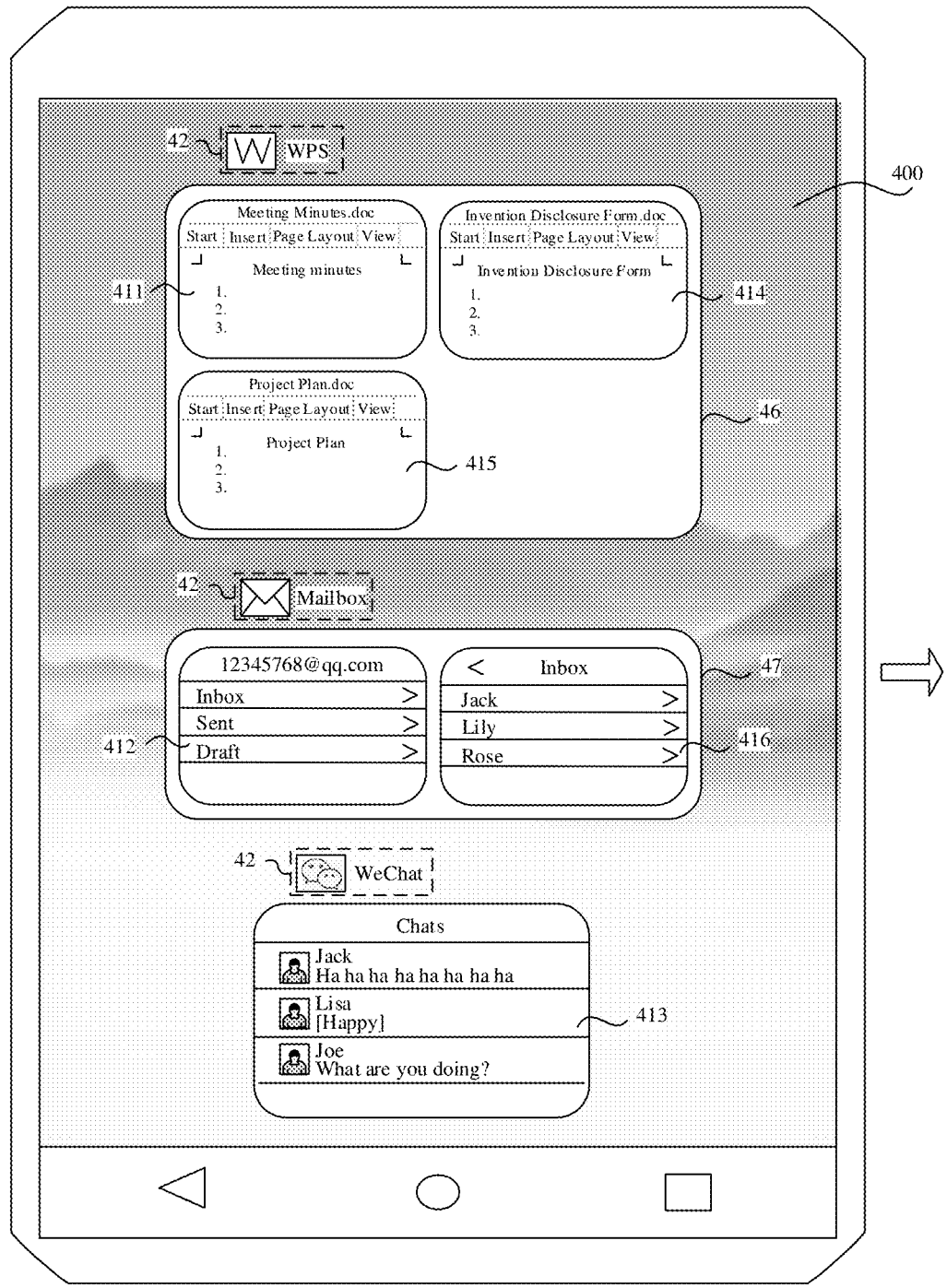
FIG. 7(a) to FIG. 7(d) are schematic interface diagrams of a multi-task management interface according to yet another embodiment of this application.
Figure 7B:
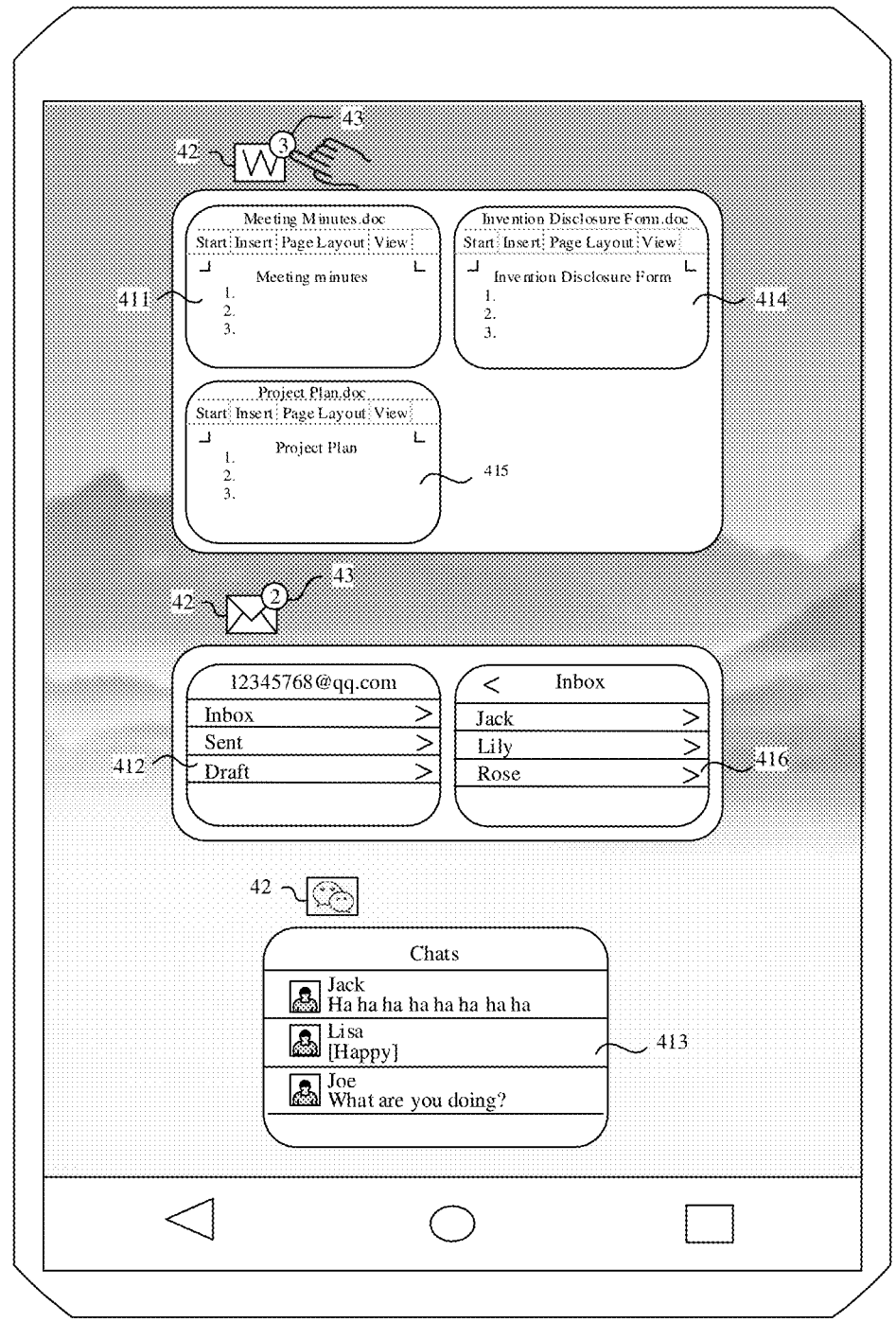
Figure 7C:
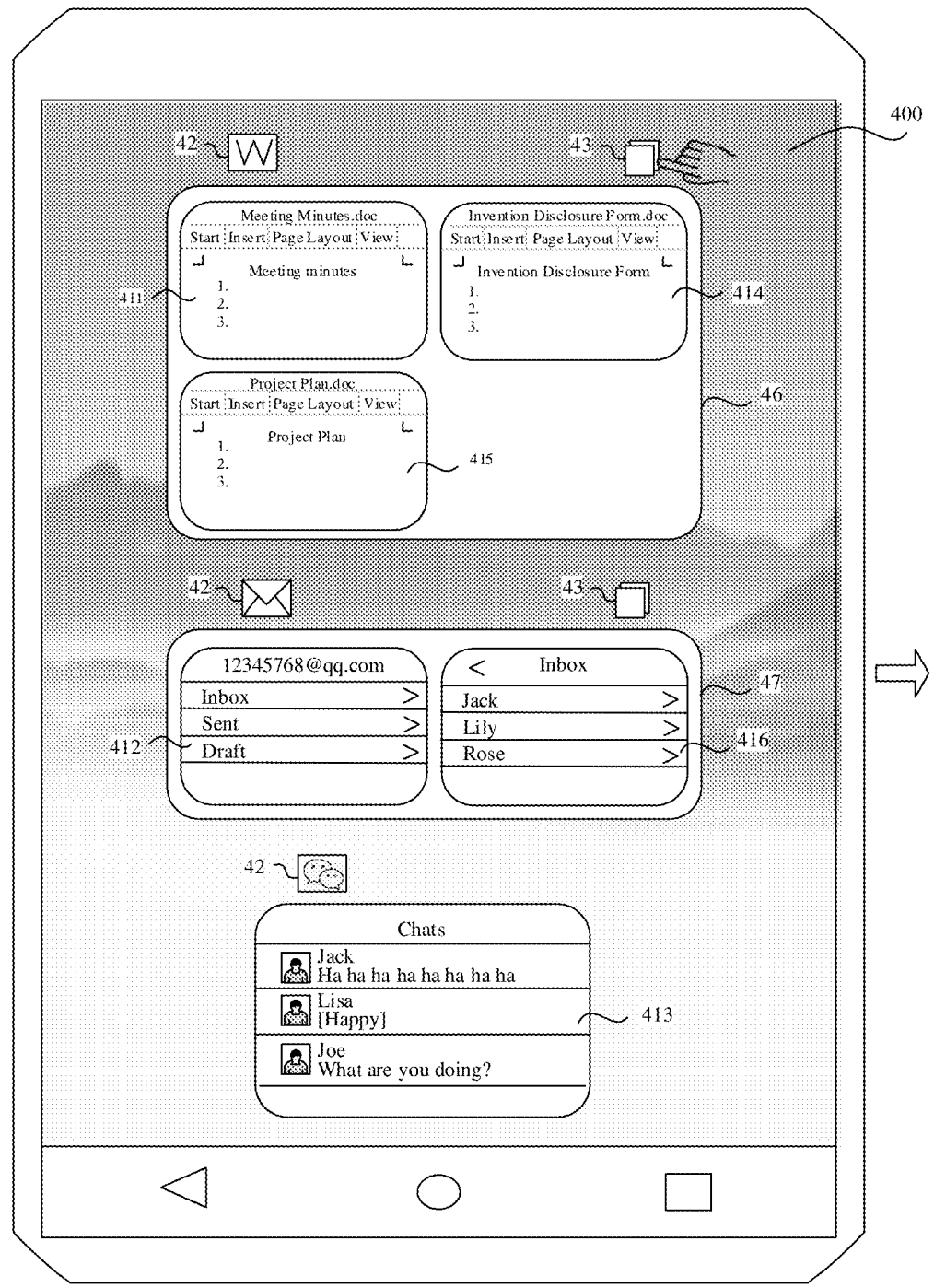
Figure 7D:
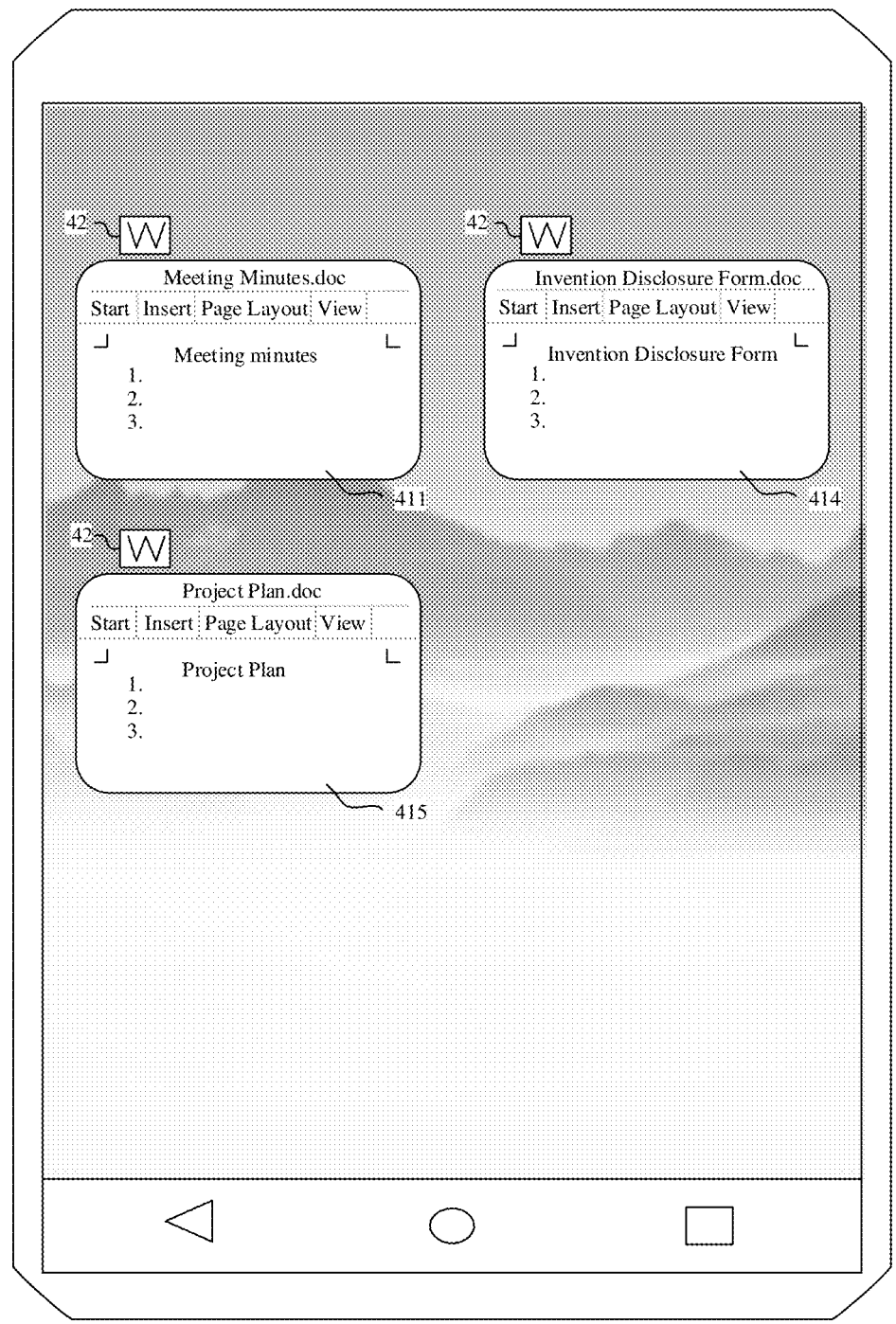

For example, as shown in FIG. 7(a), the terminal device may display, in a combined arrangement manner, the three application windows 411, 414, and 415 corresponding to WPS in an independent window 46 on the multi-task management interface 400. The terminal device may display, in a combined arrangement manner, the two application windows 412 and 416 corresponding to Mailbox in another independent window 47 on the multi-task management interface 400. The terminal device may display one application window 413 corresponding to WeChat as still another independent window on the multi-task management interface 400.

In a preferred embodiment of this application, to help the user intuitively learn of an application to which each application window displayed on the multi-task management interface belongs, the terminal device may display, on the multi-task management interface, an application identifier of the application to which each application window belongs. The application identifier may include but is not limited to an application icon, an application name, and/or the like. A specific form of the application identifier is not specially limited in this embodiment of this application. A first preset location may be set based on an actual requirement. The first preset location is not specially limited in this embodiment of this application. By way of example, and not limitation, the first preset location may be a location that is above an application window and that is close to an upper left corner of the application window.

Specifically, when the terminal device uses the foregoing first implementation to display, on the multi-task management interface, the application window corresponding to the application in a running state, the terminal device may display, after independently displaying each application window corresponding to the application in a running state, at a first preset location of each application window, an application identifier of the application to which the application window belongs. For example, as shown in FIG. 4(a) to FIG. 4(d), the terminal device may display, at a location that is above an application window and that is close to an upper left corner of the application window, an application icon and/or an application name 42 of the application to which each application window belongs.

Figure 6B:
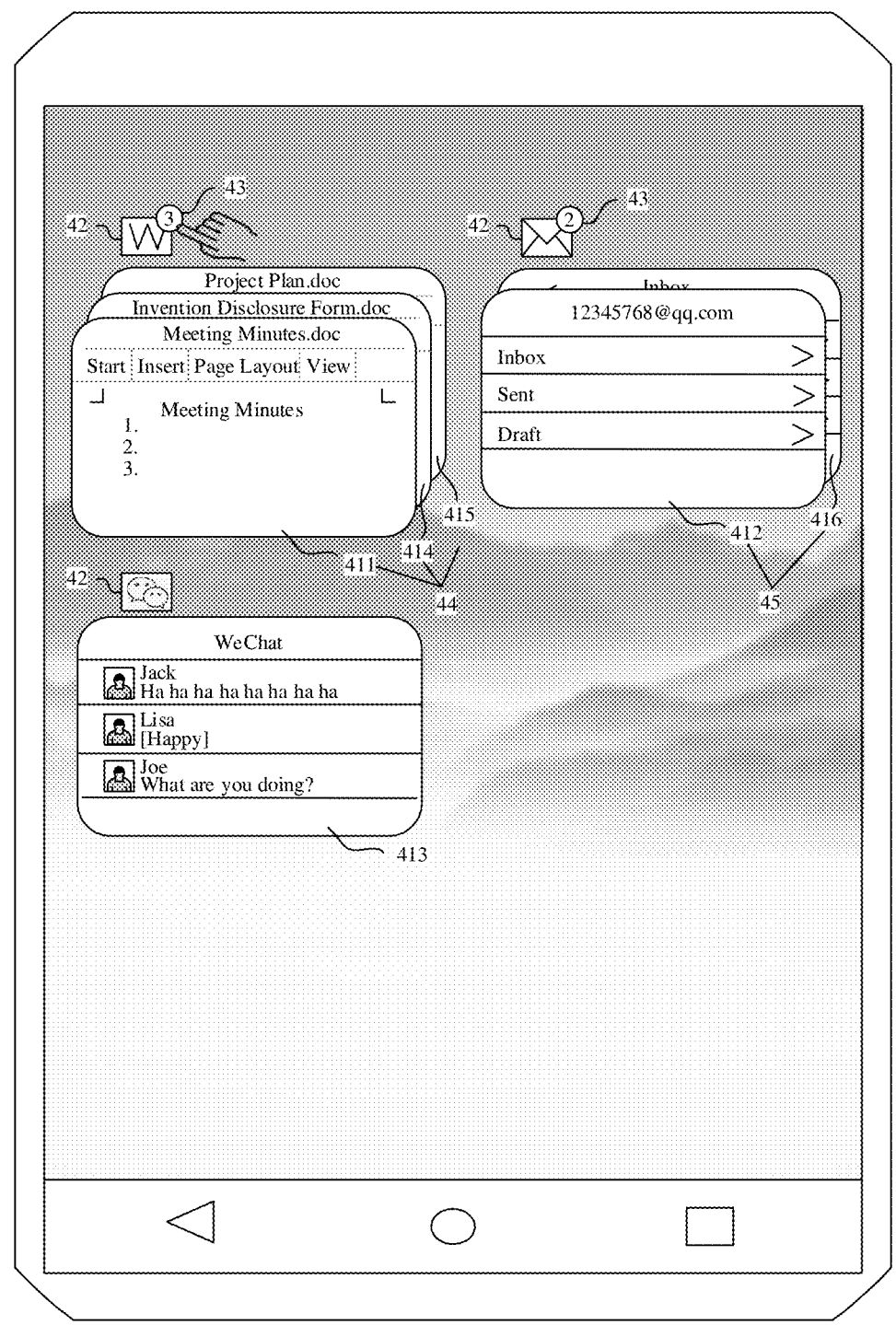
Figure 6C:
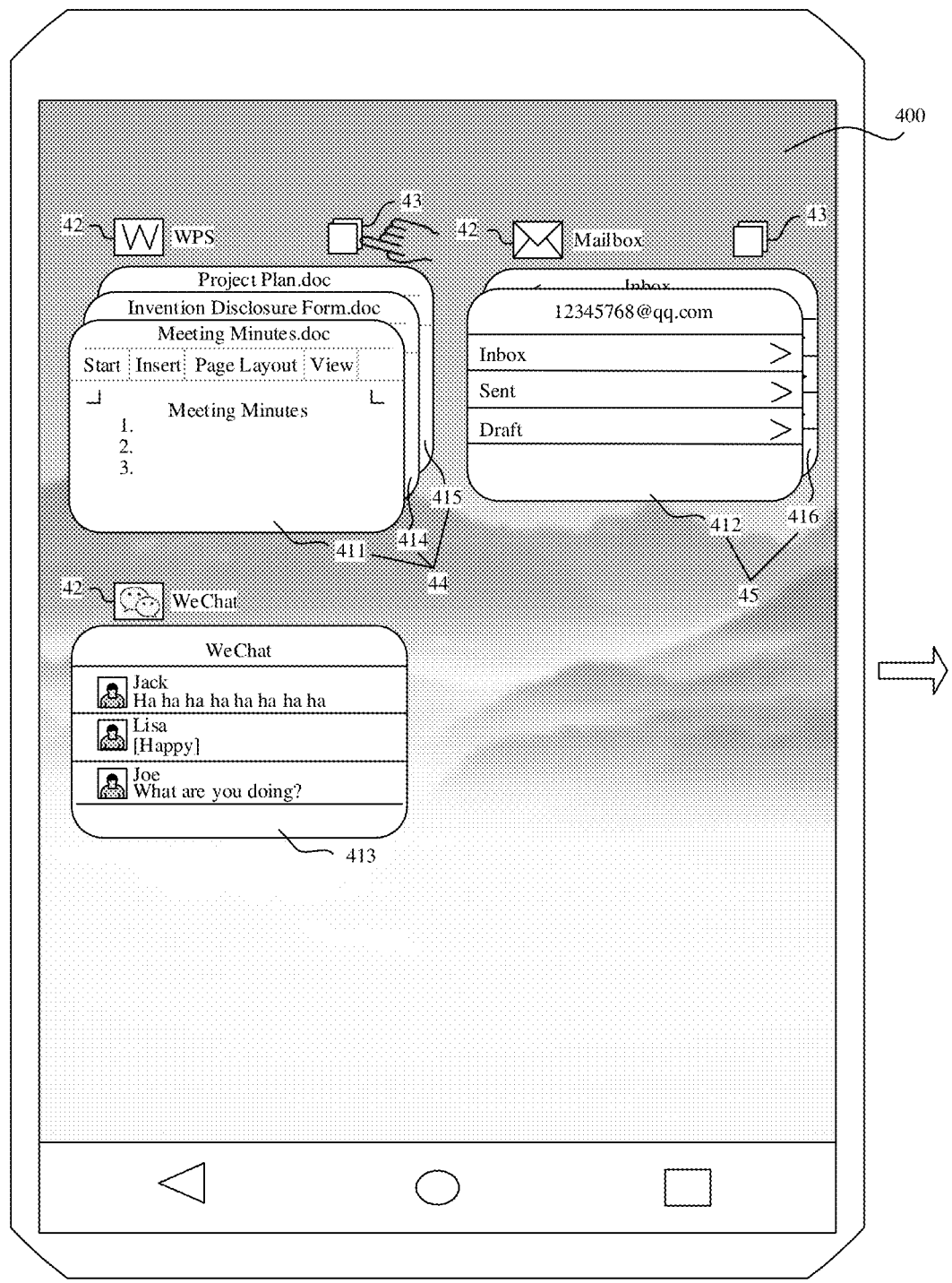
Figure 6D:
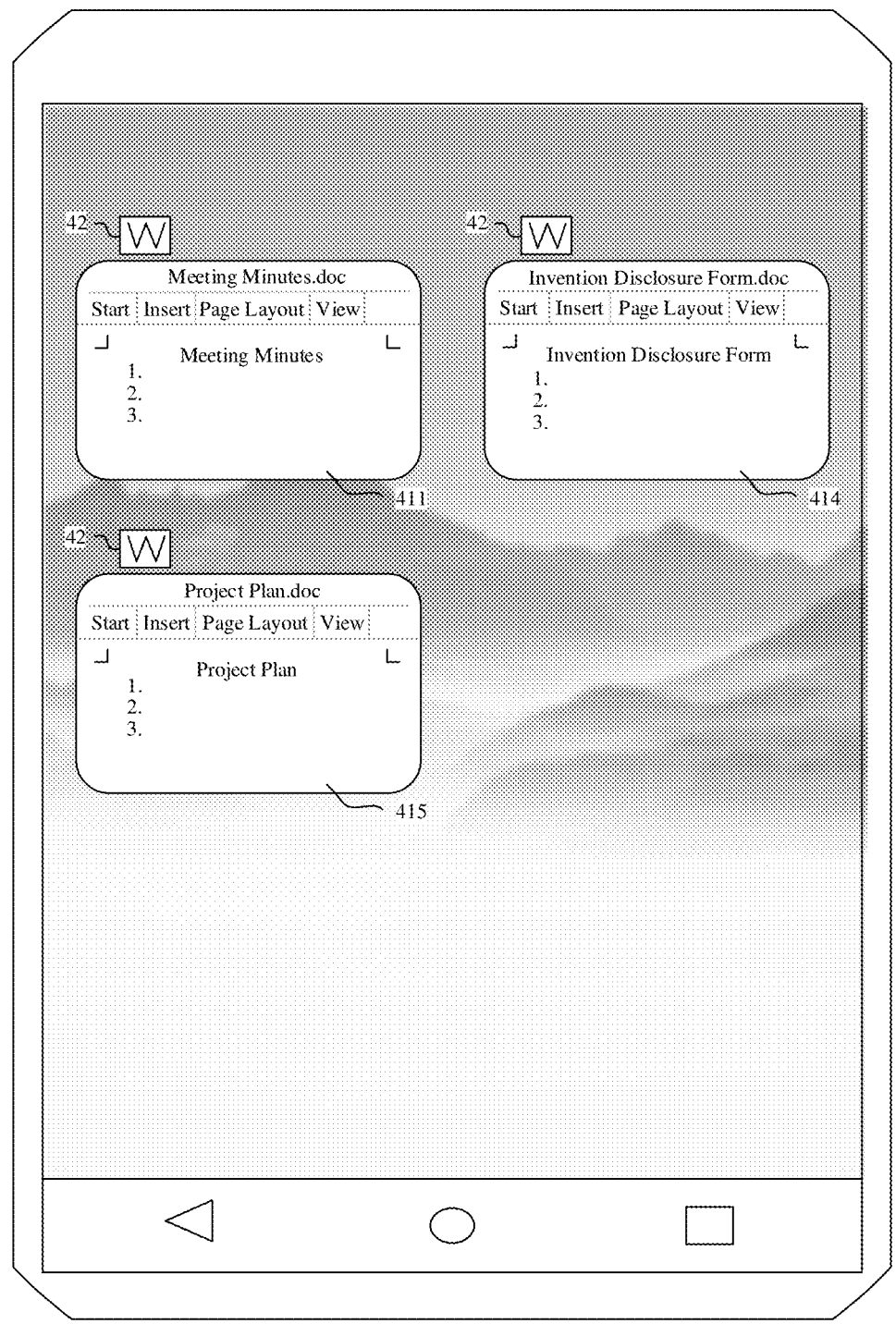

When the terminal device uses the foregoing second implementation to display, on the multi-task management interface, the application window corresponding to the application in a running state, the terminal device may display, after displaying the at least two application windows corresponding to each first application in a combination manner and independently displaying the single application window corresponding to each second application, an application identifier of the first application at a first preset location of a combination window corresponding to the first application, and an application identifier of the second application at a first preset location of the single application window corresponding to the second application. For example, as shown in FIG. 6(b), the terminal device may display an application icon and/or an application name 42 of WPS at a location that is above a combination window 44 corresponding to WPS and that is close to an upper left corner of the combination window 44, and display an application icon and/or an application name 42 of WeChat at a location that is above the single application window 413 corresponding to WeChat and that is close to an upper left corner of the application window 413.

S32: Display, at a second preset location of an application window corresponding to the first application, a multi-window identifier corresponding to the first application.

In this embodiment of this application, when the terminal device specifically uses the first implementation in S31 to display, on the multi-task management interface, the application window corresponding to the application in a running state, the terminal device may display, after independently displaying each application window corresponding to the application in a running state, the multi-window identifier corresponding to the first application at a second preset location of each application window corresponding to each first application.

In another embodiment of this application, when the terminal device specifically uses the second implementation in S31 to display, on the multi-task management interface, the application window corresponding to the application in a running state, the terminal device may display, after displaying the at least two application windows corresponding to each first application in a combination manner and independently displaying the single application window corresponding to each second application, at a second preset location of a combination window corresponding to each first application, the multi-window identifier corresponding to the first application.

In this embodiment of this application, the multi-window identifier may be a control, and each multi-window identifier is associated with all application windows corresponding to a first application corresponding to the multi-window identifier. The multi-window identifier may be triggered by the user to control the terminal device to open all the application windows corresponding to the first application corresponding to the multi-window identifier.

In some specific implementations, the multi-window identifier may be used only to identify that the first application corresponding to the multi-window identifier corresponds to at least two application windows. For example, the multi-window identifier may be a graphic identifier. For example, the multi-window identifier may be a graphic identifier 43 shown in FIG. 4(*c*), FIG. 5(*c*), FIG. 6(*c*), or FIG. 7(*c*).

In some other specific implementations, the multi-window identifier may be further used to identify a quantity of application windows corresponding to the first application corresponding to the multi-window identifier. For example, the multi-window identifier may be a numeric identifier. For example, the multi-window identifier may also be a numeric identifier 43 shown in FIG. 4(*b*), FIG. 5(*b*), FIG. 6(*b*), or FIG. 7(*b*). A specific representation manner of the multi-window identifier is not specifically limited in this embodiment of this application.

In this embodiment of this application, the second preset location may alternatively be set based on an actual requirement.

In some specific implementations, a display area corresponding to the second preset location may overlap a display area corresponding to the first preset location, that is, the terminal device may display the multi-window identifier and the application identifier in an overlapping manner. By way example, and not limitation, both the second preset location and the first preset location may be a location that is above an application window and that is close to an upper left corner of the application window. Specifically, as shown in FIG. 4(*b*), FIG. 5(*b*), FIG. 6(*b*), or FIG. 7(*b*), the terminal device may display the multi-window identifier 43 at a location such as an upper right corner or an upper left corner of the application identifier 42. A display area corresponding to the multi-window identifier partially overlaps a display area corresponding to the application identifier.

In some other specific implementations, the display area corresponding to the second preset location may not overlap the display area corresponding to the first preset location, that is, the terminal device may separately display the multi-window identifier and the application identifier. By way example, and not limitation, the first preset location may be a location that is above an application window and that is close to an upper left corner of the application window, and the second preset location may be a location above an application window and close to an upper right corner of the application window. Specifically, as shown in FIG. 4(*c*), FIG. 5(*c*), FIG. 6(*c*), or FIG. 7(*c*), the terminal device may display the application identifier 42 at a location above an application window and close to an upper right corner of the application window, the multi-window identifier 43 is displayed at a location that is above an application window and close to an upper right corner of the application window. In this way, the display area corresponding to the multi-window identifier does not overlap the display area corresponding to the application identifier.

In this embodiment of this application, after the terminal device displays, at the second preset location of the application window corresponding to the first application, the multi-window identifier corresponding to the first application, when the user wants to quickly view, on the multi-task management interface, all application windows corresponding to a first application, the user may trigger a multi-window identifier of any application window corresponding to the first application, or trigger a multi-window identifier of a combination window corresponding to the first application.

S33: If it is detected that any one of the multi-window identifiers is triggered, display, on the multi-task management interface, all application windows corresponding to only a first application corresponding to the triggered multi-window identifier.

In this embodiment of this application, when detecting that a multi-window identifier is triggered by the user, the terminal device displays, on the multi-task management interface, all application windows corresponding to only a first application corresponding to the triggered multi-window identifier, and hides application windows corresponding to other applications.

For example, as shown in FIG. 4(*b*), it is assumed that the user triggers the multi-window identifier 43 displayed at a second preset location of one application window 414 corresponding to WPS. As shown in FIG. 4(*d*), the terminal device displays, on the multi-task management interface, only three application windows 411, 414, and 415 corresponding to WPS. Alternatively, as shown in FIG. 4(*c*), it is assumed that the user triggers the multi-window identifier 43 displayed at a second preset location of another application window 411 corresponding to WPS. As shown in FIG. 4(*d*), the terminal device also displays, on the multi-task management interface, only three application windows 411, 414, and 415 corresponding to WPS.

The terminal device only displays, on the multi-task management interface, all application windows corresponding to a specific first application. If it is detected that the user triggers an application window, the terminal device exits the multi-task management interface, and displays, on the foreground, the application window triggered by the user. For example, as shown in FIG. 4(*d*), it is assumed that the user triggers the application window 415. The terminal device exits the multi-task management interface, and displays the application window 415 in the foreground.

It can be learned from foregoing that, according to the application window management method provided in this embodiment of this application, the multi-window identifier is displayed at the second preset location of the application window corresponding to the first application on the multi-task management interface, to inform a user that an application to which an application window displaying the multi-window identifier belongs corresponds to a plurality of application windows, and an application to which an application window not displaying the multi-window identifier belongs corresponds to only one application window. In this case, the user can intuitively learn, by checking whether the multi-window identifier is displayed, a quantity of application windows corresponding to an application to which each application window belongs. In addition, the user can quickly view, by triggering the multi-window identifier, all application windows corresponding to the first application corresponding to the multi-window identifier triggered by the user. This helps the user quickly find, from all the application windows corresponding to the first application, an application window that the user wants to open. Therefore, application window search efficiency is improved.

In still another embodiment of this application, when the terminal device specifically uses the second implementation in S31 to display, on the multi-task management interface, the application window corresponding to the application in a running state, the terminal device may not perform S32 to S33 after performing S31, but perform the following step:

if it is detected that any one of the combination windows is triggered, displaying, on the multi-task management interface, all application windows corresponding to only the triggered combination window.

Figure 8A:
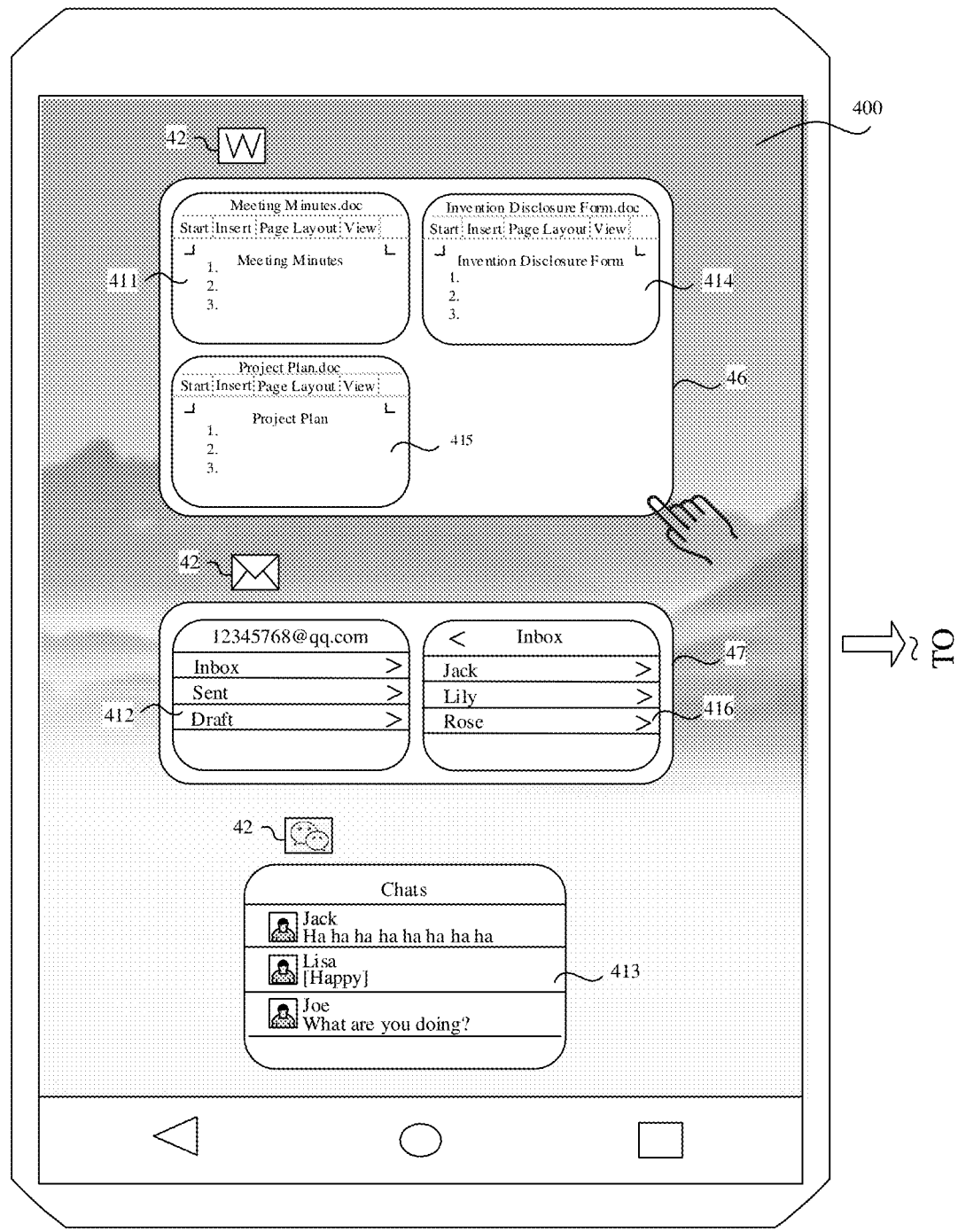
FIG. 8(a) and FIG. 8(b) are schematic interface diagrams of a multi-task management interface according to still yet another embodiment of this application.
Figure 8B:
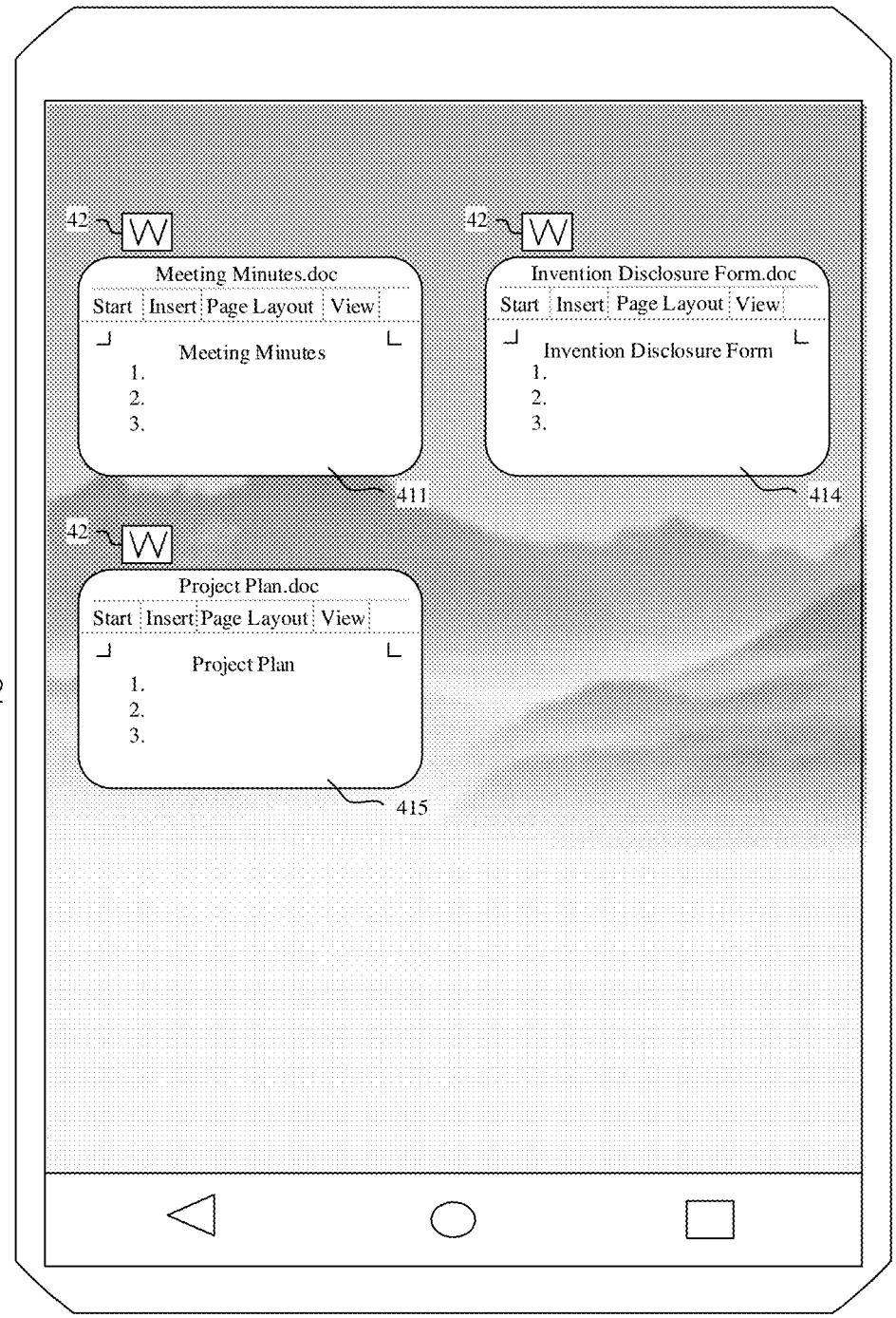

In this embodiment, each combination window may be triggered by the user to control the terminal device to display, on the multi-task management interface, all application windows corresponding to a combination window. Therefore, after the terminal device uses the second implementation in S31 to display, on the multi-task management interface, the application window corresponding to the application in a running state, the terminal device may not display a multi-window identifier. When detecting that a combination window is triggered by the user, the terminal device only displays, on the multi-task management interface, all application windows corresponding to the combination window, and hides application windows corresponding to other applications. For example, as shown in FIG. 8(*a*), if the terminal device detects that the user triggers the combination window 46 corresponding to WPS, as shown in FIG. 8(*c*), the terminal device may display, on the multi-task management interface, only three application windows 411, 414, and 415 corresponding to WPS.

In this embodiment, a plurality of application windows corresponding to the first application are displayed in a combination manner on the multi-task management interface, so that the user may control, by triggering a combination window corresponding to the first application, the terminal device to display all application windows corresponding to the first application. This helps the user quickly view, on the multi-task management interface, all application windows corresponding to any one of the first applications.

It may be understood that sequence numbers of the processes do not mean execution sequences in the foregoing embodiments. The execution sequences of the processes should be determined according to functions and internal logic of the processes, and should not be construed as any limitation on the implementation processes of embodiments of this application.

Figure 9:
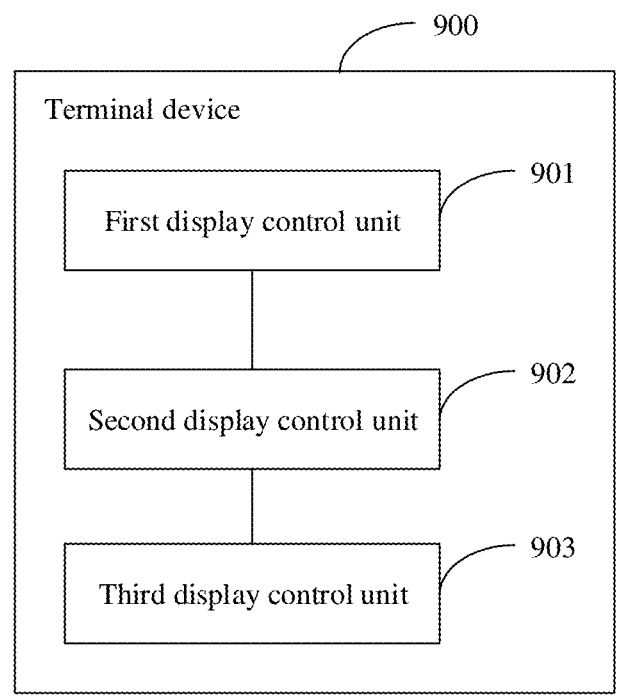
FIG. 9 is a schematic diagram of a structure of a terminal device according to an embodiment of this application.

Corresponding to the application window management method in the foregoing embodiment, FIG. 9 is a block diagram of a structure of a terminal device according to an embodiment of this application. Units corresponding to the terminal device are configured to perform the steps in the foregoing embodiment. For details, refer to related descriptions in the foregoing embodiment. For ease of description, only a part related to this embodiment of this application is shown. As shown in FIG. 9, the terminal device 900 may correspond to a first display control unit 901, a second display control unit 902, and a third display control unit 903.

The first display control unit 901 is configured to display, on a multi-task management interface, an application window corresponding to an application in a running state.

The second display control unit 902 is configured to display, at a second preset location of an application window corresponding to a first application, a multi-window identifier corresponding to the first application. The first application is an application that corresponds to at least two application windows and that is in the application in a running state.

The third display control unit 903 is configured to: if it is detected that any one of the multi-window identifiers is triggered, display, on the multi-task management interface, all application windows corresponding to only a first application corresponding to the triggered multi-window identifier.

In an embodiment of this application, the first display control unit 901 is specifically configured to:

independently display, on the multi-task management interface, each application window corresponding to the application in a running state.

Correspondingly, the second display control unit 902 is specifically configured to:

display, at a second preset location of each application window corresponding to the first application, the multi-window identifier corresponding to the first application.

In another embodiment of this application, the first display control unit 901 is specifically configured to:

display, on the multi-task management interface in a combination manner, at least two application windows corresponding to each first application, and independently display a single application window corresponding to each second application. The second application is an application that corresponds to only one application window and that is in the application in a running state.

Correspondingly, the second display control unit 902 is specifically configured to:

display, at a second preset location of a combination window corresponding to the first application, a multi-window identifier corresponding to the first application. The combination window is formed by combining at least two application windows corresponding to the first application.

In still another embodiment of this application, the terminal device 900 further corresponds to a fourth display control unit.

The fourth display control unit is configured to display, at a first preset location of each application window, an application identifier of an application to which the application window belongs.

In yet another embodiment of this application, the fourth display control unit is further configured to:

display, at a first preset location of the combination window corresponding to the first application, an application identifier of the first application, and display, at a first preset location of the single application window corresponding to the second application, an application identifier of the second application.

In yet another embodiment of this application, a display area corresponding to the second preset location overlaps a display area corresponding to the first preset location.

In yet another embodiment of this application, a display area corresponding to the second preset location does not overlap a display area corresponding to the first preset location.

It can be learned from foregoing that in the terminal device provided in this embodiment of this application, the multi-window identifier is displayed at the second preset location of the application window corresponding to the first application on the multi-task management interface, to inform a user that an application to which an application window displaying the multi-window identifier belongs corresponds to a plurality of application windows, and an application to which an application window not displaying the multi-window identifier belongs corresponds to only one application window. In this case, the user can intuitively learn, by checking whether the multi-window identifier is displayed, a quantity of application windows corresponding to an application to which each application window belongs. In addition, the user can quickly view, by triggering the multi-window identifier, all application windows corresponding to the first application corresponding to the multi-window identifier triggered by the user. This helps the user quickly find, from all the application windows corresponding to the first application, an application window that the user wants to open. Therefore, application window search efficiency is improved.

Figure 10:
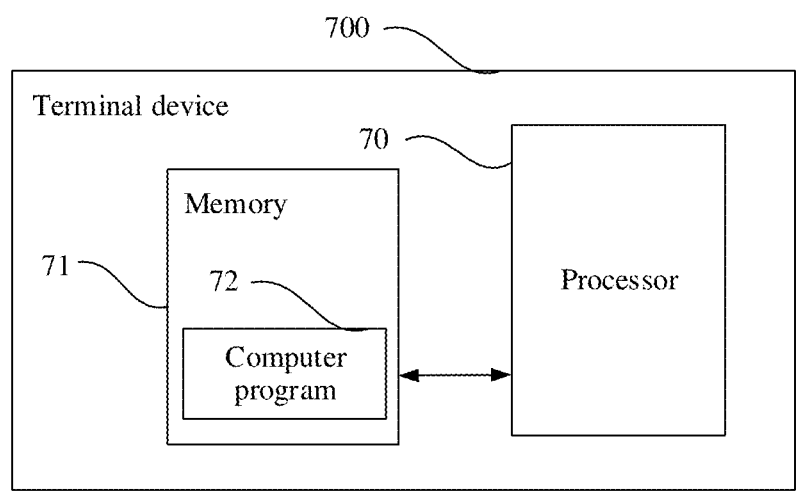
FIG. 10 is a schematic diagram of a structure of another terminal device according to an embodiment of this application.

FIG. 10 is a schematic diagram of a structure of a terminal device according to another embodiment of this application. As shown in FIG. 10, the terminal device 700 in this embodiment includes: at least one processor 70 (only one processor is shown in FIG. 10), a memory 71, and a computer program 72 that is stored in the memory 71 and that can be run on the at least one processor 70. When executing the computer program 72, the processor 70 implements steps in any one of the foregoing application window management method embodiments.

The terminal device 700 may be a computing device, for example, a desktop computer, a notebook computer, a palm-top computer, or a cloud server. The terminal device may include but is not limited to the processor 70 and the memory 71. A person skilled in the art may understand that FIG. 10 is merely an example of the terminal device 700, and does not constitute a limitation on the terminal device 700. The terminal device may include more or fewer components than those shown in the figure, or some components may be combined, or different components may be used. For example, the terminal device may further include an input/output device, a network access device, or the like.

The processor 70 may be a central processing unit (Central Processing Unit, CPU). The processor 70 may alternatively be another general-purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, or a discrete hardware component. The general-purpose processor may be a microprocessor, or the processor may be any conventional processor or the like.

In some embodiments, the memory 71 may be an internal storage unit of the terminal device 700, for example, a hard disk drive or an internal storage of the terminal device 700. In some other embodiments, the memory 71 may also be an external storage device of the terminal device 700, for example, a plug-in hard disk, a smart media card (Smart Media Card, SMC), a secure digital (Secure Digital, SD) card, or a flash card (Flash Card) that is provided on the terminal device 700. Further, the memory 71 may alternatively include both the internal storage unit and the external storage device of the terminal device 700. The memory 71 is configured to store an operating system, an application, a boot loader (Boot Loader), data, another program, and the like, for example, program code of the computer program. The memory 71 may further be configured to temporarily store data that has been output or is to be output.

It should be noted that content such as information exchange between the foregoing apparatuses/units and the execution processes thereof is based on a same concept as the method embodiments of this application. For specific functions and technical effects of the content, refer to the method embodiments. Details are not described herein again.

It may be clearly understood by a person skilled in the art that, for the purpose of convenient and brief description, division into the foregoing function units and modules is used as an example for illustration. In actual application, the foregoing functions can be allocated to different function units and modules for implementation based on a requirement, that is, an inner structure of the apparatus is divided into different function units or modules to implement all or some of the functions described above. Function units and modules in embodiments may be integrated into one processing unit, or each of the units may exist alone physically, or two or more units may be integrated into one unit. The integrated unit may be implemented in a form of hardware, or may be implemented in a form of a software function unit. In addition, specific names of the function units and modules are merely for ease of distinguishing between the function units and modules, but are not intended to limit the protection scope of this application. For a specific working process of the units and modules in the foregoing system, refer to a corresponding process in the foregoing method embodiments. Details are not repeatedly described herein.

An embodiment of this application further provides a computer-readable storage medium. The computer-readable storage medium stores a computer program. When the computer program is executed by a processor, the steps in the foregoing application window management method may be implemented.

An embodiment of this application further provides a computer program product. When the computer program product is run on a mobile terminal, the mobile terminal is enabled to implement the steps in the foregoing application window management method when executing the computer program product.

An embodiment of this application further provides a chip system. The chip system includes a memory and a processor. The processor executes a computer program stored in the memory, to implement the steps in the foregoing application window management method.

An embodiment of this application further provides another chip system. The chip system includes a processor, the processor is coupled to a memory, and the processor executes a computer program stored in the memory, to implement the steps in the foregoing application window management method.

When the integrated unit is implemented in the form of a software function unit and sold or used as an independent product, the integrated unit may be stored in a computer-readable storage medium. Based on such an understanding, all or some of the procedures of the method in embodiments of this application may be implemented by a computer program instructing related hardware. The computer program may be stored in a computer-readable storage medium.

When the computer program is executed by the processor, steps of the foregoing method embodiments may be implemented. The computer program includes computer program code. The computer program code may be in a source code form, an object code form, an executable file form, some intermediate forms, or the like. The computer-readable medium may include at least any entity or apparatus that can carry computer program code to a photographing apparatus/terminal device, a recording medium, a computer memory, a read-only memory (ROM, Read-Only Memory), a random access memory (RAM, Random Access Memory), an electrical carrier signal, a telecommunication signal, and a software distribution medium, for example, a USB flash drive, a removable hard disk, a magnetic disk, or an optical disk. In some jurisdictions, the computer-readable medium cannot be the electrical carrier signal or the telecommunication signal according to legislation and patent practices.

In the foregoing embodiments, the description of each embodiment has respective focuses. For a part that is not described in detail or recorded in an embodiment, refer to related descriptions in other embodiments.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An application window management method, comprising:
    independently displaying, on a multi-task management interface, M application windows opened in a full-screen mode, wherein the multi-task management interface is separate from a desktop interface, wherein the M application windows are displayed in an order according to a time at which each respective application window was last operated by a user, wherein each application window of the M application windows that is displayed separately from each other application window of the M application windows, wherein each application window of the M application windows has a separate application identifier identifying an application that corresponds to the respective application window displayed in proximity the respective application window and that is displayed separately from each other application identifier of each other application window of the M application windows, wherein the M application windows includes at least two first application windows associated with a same first application, wherein the M application windows further include at least one second application window associated with a second application different from the first application, wherein M is an integer greater than 2, and wherein the independently displaying the M application windows comprises displaying each application window of the M application windows, including the at least two first application windows and the at least one second application windows, in its entirety and spaced apart from each other application window of the M application windows, simultaneously with display of each other application window of the M application windows;
    displaying a plurality of multi-window identifiers corresponding to the first application, wherein the first application is an application that corresponds to the at least two first application windows, wherein each multi-window identifier of the plurality of multi-window identifiers is displayed at a second preset location associated with a respective application window of the at least two first application windows; and
    independently displaying, on the multi-task management interface, based on detecting that any one of the plurality of multi-window identifiers is triggered, all application windows that are of the at least two first application windows and that correspond to only the first application corresponding to the triggered multi-window identifier, wherein each of the application windows corresponding to the first application is an independent small window on the multi-task management interface, and wherein application windows corresponding to applications other than the first application, including the at least one second application window corresponding to the second application, are hidden.

2. The application window management method according to claim 1, wherein the method further comprises:
    displaying, at a first preset location of each application window, the application identifier of an application to which the application window belongs.

3. The application window management method according to claim 2, wherein a display area corresponding to the second preset location overlaps a display area corresponding to the first preset location.

4. The application window management method according to claim 2, wherein a display area corresponding to the second preset location does not overlap a display area corresponding to the first preset location.

5. The application window management method according to claim 1, wherein the independently displaying the M application windows opened in a full-screen mode comprises displaying the at least one second application window associated with the second application at at least one window display location on the multi-task management interface; and wherein the independently displaying all application windows that are of the at least two first application windows and that correspond to only the first application corresponding to the triggered multi-window identifier at the at least one window display location at which the at least one second application window associated with the second application was displayed.

6. The method of claim 1, wherein each multi-window identifier of the plurality of multi-window identifiers displays a numeral indicating a count of application windows associated with the first application.

7. The method of claim 1, wherein each multi-window identifier of the plurality of multi-window identifiers is displayed completely separately and spaced apart from each application window of the M application windows.

8. The method of claim 1, wherein each multi-window identifier of the plurality of multi-window identifiers is displayed while performing the displaying of each application window of the M application windows, including the at least two first application windows and the at least one second application window, in its entirety and separately and spaced apart from each other application window of the M application windows, simultaneously with the display of each other application window of the M application windows.

9. A terminal device, comprising:
at least one processor; and
a non-transitory computer-readable storage medium connected to the at least one processor and including computer program code, wherein the non-transitory computer readable storage medium and the computer program code are configured, with the at least one processor, to cause the terminal device to at least:
independently display M application windows opened in a full-screen mode on a multi-task management interface, wherein the M application windows are independently displayed in an order according to a time at which each respective application window was last operated by a user, wherein the multi-task management interface is separate from a desktop interface, wherein each application window of the M application windows is displayed separately from each other application window of the M application windows, wherein each application window of the M application windows has a separate application identifier identifying an application that corresponds to the respective application window displayed in proximity the respective application window and that is displayed separately from each other application identifier of each other application window of the M application windows, wherein the M application windows includes at least two first application windows associated with a same first application, wherein the M application windows further include at least one second application window associated with a second application different from the first application, wherein M is an integer greater than 2, and wherein the independently displaying the M application windows comprises displaying each application window of the M application windows, including the at least two first application windows and the at least one second application windows, in its entirety and spaced apart from each other application window of the M application windows, simultaneously with display of each other application window of the M application windows;

display a plurality of multi-window identifiers corresponding to the first application, wherein the first application is an application that corresponds to the at least two first application windows, wherein each multi-window identifier of the plurality of multi-window identifiers is displayed at a second preset location associated with a respective application windows of the at least two first application windows; and independently display, based on detecting that any one of the plurality of multi-window identifiers is triggered, all application windows that are of the at least two first application windows and that correspond to only the first application corresponding to the triggered multi-window identifier on the multi-task management interface, wherein each of the application windows corresponding to the first application is an independent small window on the multi-task management interface, and wherein application windows corresponding to applications other than the first application, including the at least one second application window corresponding to the second application, are hidden.

10. The terminal device according to claim 9, wherein the wherein the non-transitory computer readable storage medium and the computer program code are further configured, with the at least one processor, to cause the terminal device to:
display the application identifier of an application to which the application window belongs at a first preset location of each application window.

11. The terminal device according to claim 10, wherein a display area corresponding to the second preset location overlaps a display area corresponding to the first preset location.

12. The terminal device according to claim 10, wherein a display area corresponding to the second preset location does not overlap a display area corresponding to the first preset location.

13. The terminal device according to claim 9, wherein independently displaying the M application windows opened in a full-screen mode comprises displaying the at least one second application window associated with a second application at at least one window display location on the multi-task management interface; and wherein independently displaying all application windows that are of the at least two first application windows and that correspond to only the first application corresponding to the triggered multi-window identifier at the at least one window display location at which the at least one second application window associated with the second application was displayed.

* * * * *

UNITED STATES PATENT AND TRADEMARK OFFICE
CERTIFICATE OF CORRECTION

PATENT NO. : 12,346,557 B2
APPLICATION NO. : 17/921568
DATED : July 1, 2025
INVENTOR(S) : Wang et al.

Page 1 of 1

It is certified that error appears in the above-identified patent and that said Letters Patent is hereby corrected as shown below:

In the Specification

In Column 6, Line 44, delete "18H," and insert -- 180H, --.

In Column 7, Line 43, delete "no may" and insert -- 110 may --.

Signed and Sealed this
Twenty-first Day of October, 2025

John A. Squires
*Director of the United States Patent and Trademark Office*